US011294669B2

(12) United States Patent
Hohenstein et al.

(10) Patent No.: US 11,294,669 B2
(45) Date of Patent: Apr. 5, 2022

(54) METHOD AND COMPUTER-PROGRAM-PRODUCT DETERMINING MEASURES FOR THE DEVELOPMENT, DESIGN AND/OR DEPLOYMENT OF COMPLEX EMBEDDED OR CYBER-PHYSICAL SYSTEMS, IN PARTICULAR COMPLEX SOFTWARE ARCHITECTURES USED THEREIN, OF DIFFERENT TECHNICAL DOMAINS

(71) Applicant: Siemens Aktiengesellschaft, Munich (DE)

(72) Inventors: Uwe Hohenstein, Vaterstetten (DE); Andreas Biesdorf, Trier (DE); Christoph Brand, Princeton, NJ (US); Martin Kramer, Munich (DE); Manoj Mahabaleshwar, Munich (DE); Klym Shumaiev, Garching (DE)

(73) Assignee: SIEMENS AKTIENGESELLSCHAFT

( * ) Notice: Subject to any disclaimer, the term of this patent is extended or adjusted under 35 U.S.C. 154(b) by 0 days.

(21) Appl. No.: 16/960,252

(22) PCT Filed: Mar. 4, 2019

(86) PCT No.: PCT/EP2019/055329
§ 371 (c)(1),
(2) Date: Jul. 6, 2020

(87) PCT Pub. No.: WO2019/170607
PCT Pub. Date: Sep. 12, 2019

(65) Prior Publication Data
US 2021/0072983 A1   Mar. 11, 2021

(30) Foreign Application Priority Data
Mar. 5, 2018  (EP) .................................... 18159978

(51) Int. Cl.
*G06F 9/44*  (2018.01)
*G06F 9/455*  (2018.01)
(Continued)

(52) U.S. Cl.
CPC .................. *G06F 8/77* (2013.01); *G06F 8/61* (2013.01); *G06F 17/16* (2013.01)

(58) Field of Classification Search
CPC .............. G06F 8/77; G06F 8/61; G06F 17/16
See application file for complete search history.

(56) References Cited

U.S. PATENT DOCUMENTS

2004/0220839 A1\* 11/2004 Bonissone ............. G06Q 10/10
705/4
2005/0114829 A1\* 5/2005 Robin .................... G06Q 10/06
717/101

(Continued)

FOREIGN PATENT DOCUMENTS

IN   734MUM2009 A   11/2011

OTHER PUBLICATIONS

Khalil Drira, Software Architecture, 2013, pp. 1-368. https://link.springer.com/book/10.1007/978-3-642-39031-9 (Year: 2013).\*

(Continued)

*Primary Examiner* — Mongbao Nguyen
(74) *Attorney, Agent, or Firm* — Schmeiser, Olsen & Watts LLP

(57) ABSTRACT

In order to improve the development, design and/or deployment of the complex embedded or the cyber-physical systems and in particular the complex software architectures being included and/or used therein of the different technical domains it is proposed a sophisticated expertise or tool-significant Measure Recommendation System. This Measure Recommendation System, particularly formed by the Computer-Program-Product, is tailored to determine and (Continued)

provide appropriate measures to effectively improve the decision-making process during the design, development and/or deployment of the systems of the different technical domains by automatically providing Measure Determining Vectors.

18 Claims, 8 Drawing Sheets

(51) Int. Cl.
```
G06F 9/445      (2018.01)
G06F 8/77       (2018.01)
G06F 8/61       (2018.01)
G06F 17/16      (2006.01)
```

(56) References Cited

U.S. PATENT DOCUMENTS

| | | | |
|---|---|---|---|
| 2011/0060671 | A1 | 3/2011 | Erbey et al. |
| 2013/0346131 | A1 | 12/2013 | Erbey et al. |
| 2014/0379555 | A1 | 12/2014 | Erbey et al. |
| 2016/0261466 | A1 | 9/2016 | Daniel et al. |
| 2017/0006135 | A1* | 1/2017 | Siebel ............... H04L 67/20 |
| 2017/0031663 | A1* | 2/2017 | Daniel ............... G06F 8/36 |
| 2017/0060992 | A1* | 3/2017 | Bhide ............... G06F 16/3331 |
| 2018/0374024 | A1* | 12/2018 | Cai ............... G06F 17/16 |
| 2019/0087529 | A1* | 3/2019 | Steingrimsson ..... G06N 3/0454 |
| 2019/0171438 | A1* | 6/2019 | Franchitti ........... G06F 16/9538 |

OTHER PUBLICATIONS

I-Ling Yen, A Framework for IoT-Based Monitoring and Diagnosis of Manufacturing Systems, 2017, pp. 1-8., https://ieeexplore.ieee.org/stamp/stamp.jsp?tp=&arnumber=7943285 (Year: 2017).*

C. Miesbauer and R. Weinreich, "Classification of design decisions" an expert survey in practice, in European Conference on Software Architecture. Springer, 2013, pp. 130-145.

https://en.wikipedia.org/wiki/Issue_tracking_system retrieved Jan. 18, 2018.

C. Zannier, M. Chiasson, and F. Maurer, "A model of design decision making based on empirical results of interviews with software designers," Information and Software Technology, vol. 49, No. 6, pp. 637-653, 2007.

PCT International Search Report and Written Opinion of International Searching Authority dated May 24, 2019 corresponding to PCT International Application No. PCT/EP2019/055329 filed Mar. 4, 2019.

S. T. Hassard, A. Blandford, and A. L. Cox, "Analogies in design decision-making," in Proceedings of the 23rd British HCI group annual conference on people and computers: celebrating people and technology. British Computer Society, 2009, pp. 140-148.

C. Zannier and F. Maurer, "Social factors relevant to capturing design decisions," in Proceedings of the Second Workshop on Sharing and Reusing architectural Knowledge Architecture, Rationale, and Design Intent. IEEE Computer Society, 2007, p. 1.

https://en.wikipedia.org/wiki/Knowledge_base retrieved Feb. 13, 2018.

https://en.wikipedia.org/wiki/software_architecture retrieved Mar. 1, 2018).

M. Galster, D. A. Tamburri, and R. Kazman, "Towards understanding the social and organizational dimensions of software architecting," ACM SIGSOHT Software Engineering Notes, vol. 42, No. 3, pp. 24-25, 2017.

https://en.wikipedia.org/wiki/cyber-physical_system retrieved Jan. 30, 2018.

H. Van Vliet and A. Tang, "Decision making in software architecture," Journal of Systems and Software, vol. 117, pp. 638-644, 2016.

A. Tang, M. Razavian, B. Paech, and T.-M. Hesse, "Human aspects in software architecture decision making: A literature review," in Software Architecture (ICSA), 2017 IEEE International Conference on. IEEE, 2017, pp. 107-116.

Ying Annie T T et al: "Developer Profiles for Recommendation Systems"; In: "Recommendation Systems in Software Engineering", 2014, Springer, XP055588785, ISBN: 978-3-642-45135-5; pp. 199-222, DOI: 10.1007/978-3-642-45135-5 8, subsection 8.2.2; section 8.3, in particular subsection 8.3.3; 2014.

Manoj Bhat et al: "Meta-model based framework for architectural knowledge management", Software Architecture Workshops, ACM, 2 Penn Plaza, Suite 701 New York NY 10121-0701 USA, pp. 1-7, XP058307599, DOI: 10.1145/2993412.3004848; ISBN: 978-1-4503-4781-5; section 2, in particular subsections 2.3 and 2.4; 2016.

* cited by examiner

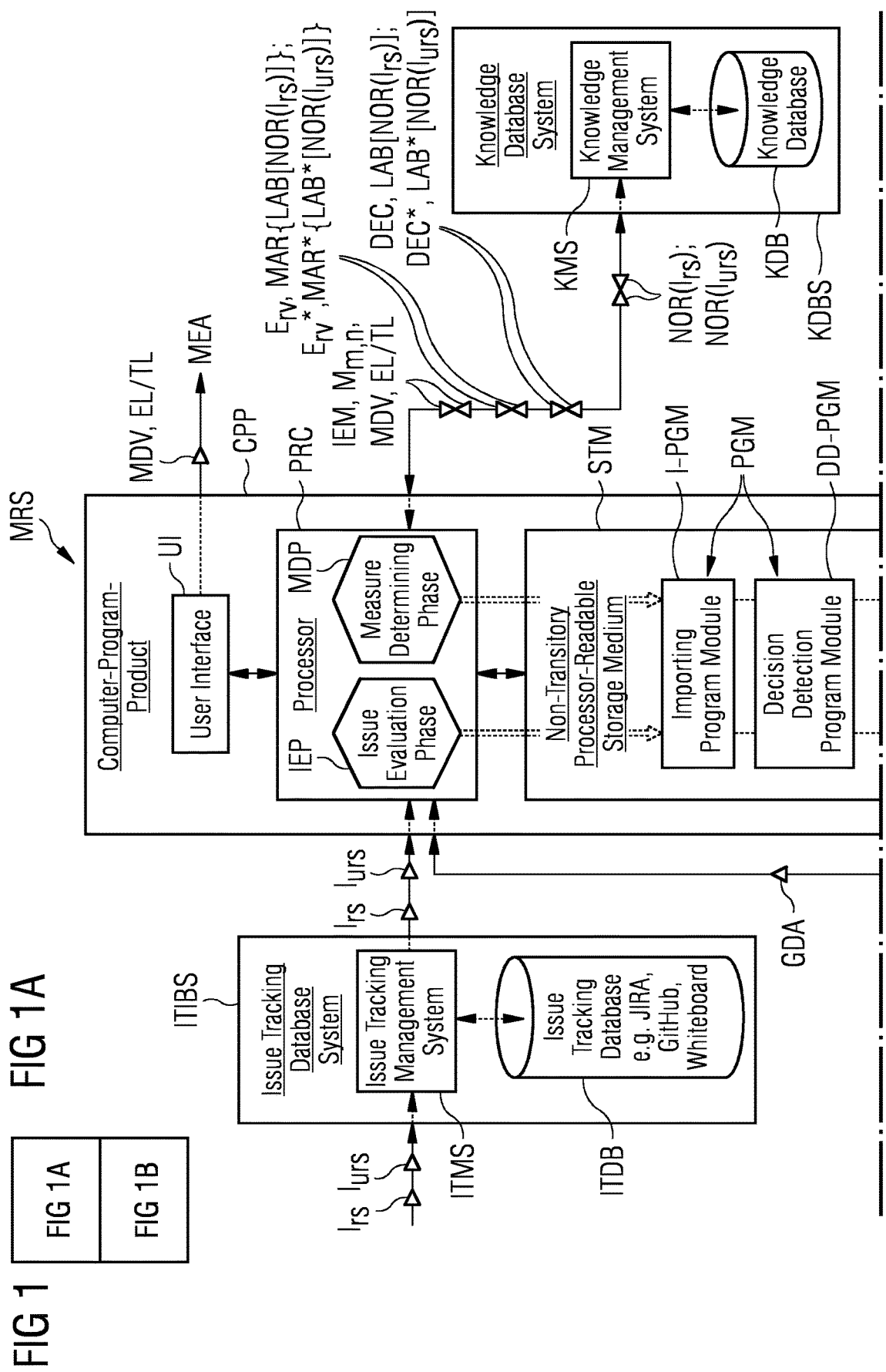

METHOD AND COMPUTER-PROGRAM-PRODUCT DETERMINING MEASURES FOR THE DEVELOPMENT, DESIGN AND/OR DEPLOYMENT OF COMPLEX EMBEDDED OR CYBER-PHYSICAL SYSTEMS, IN PARTICULAR COMPLEX SOFTWARE ARCHITECTURES USED THEREIN, OF DIFFERENT TECHNICAL DOMAINS

CROSS-REFERENCE TO RELATED APPLICATIONS

This application claims priority to PCT Application No. PCT/EP2019/055329, having a filing date of Mar. 4, 2019, which is based off of EP Application No. 18159978.8, having a filing date of Mar. 5, 2018, the entire contents both of which are hereby incorporated by reference.

FIELD OF TECHNOLOGY

The following refers to a method determining measures for the development, design and/or deployment of complex embedded or cyber-physical systems, in particular complex software architectures used therein, of different technical domains and a Computer-Program-Product determining measures for the development, design and/or deployment of complex embedded or cyber-physical systems, in particular complex software architectures used therein, of different technical domains.

BACKGROUND

In order to develop, design and/or deploy complex embedded or cyber-physical systems and especially the complex software architectures being included therein used in different technical areas, such as aerospace, automotive, chemical processes, civil infrastructure, energy, healthcare, manufacturing, transportation, entertainment, consumer appliances etc., it is expedient to make sustainable decisions during the development, design and/or deployment. The latter encompasses also the maintenance of those systems respective architectures.

Decisions are important for complex technical systems consisting of software and hardware parts. It is commonly accepted that the software architecture of the system comprises a set of (design) decisions. Taking a wrong or sub-optimal decision can have a negative impact on the overall quality of the system architecture and its technical system.

In this context

A Cyber-physical system refers to a system of collaborating computational elements controlling physical entities (https://en.wikipedia.org/wiki/cyber-physical_system in the revision of Jan. 30, 2018), whereby the technical domains could be diverse as areas like aerospace, automotive, chemical processes, civil infrastructure, manufacturing, transportation, energy, healthcare, entertainment, consumer appliance etc. and include technical capital and/or producer goods.

A Software-architecture refers to a high-level structure of a software system, the discipline of creating such a high-level structure, and the documentation of this structure (https://en.wikipedia.org/wiki/software_architecture in the revision of Mar. 1, 2018). At a broader scope, an architecture or system architecture refers to a high-level structure of a technical system analogously.

A (Design-)Decision or a set of (Design-)Decisions is the basic component of a architecture or system-architecture. System architects regularly make decisions not only during the initial definition of the architecture but also during maintenance of the technical system. Decisions address stakeholders' concerns which affect the elements of technical systems.

During the decision-making process, individuals like architects and developers favor a naturalistic approach for the decision making [1] to [3].

In this regard, personal experience and knowledge of architects and developers play a crucial role in the decision-making process [3], [4].

Empirical studies have shown that compared to novices, experienced architects and developers effectively explore the problem space and use efficient decision-making strategies [5].

However, there is the inherent problem of finding experienced architects, who especially possess adequate knowledge to solve a particular problem. Moreover, the quantification of personal experience is still an open challenge. For example, this claim is supported by one of the discussion points at the International Conference on Software Architecture 2017 conference [6]:

"Identification of 'architecture skills' within organizations and projects: Who or what are sources of architectural expertise and competencies in organizations and how can we identify them? . . . ."

The problem is intensified by the fact that complex embedded or cyber-physical systems are large and involve large development teams. A manual selection of appropriate measures to be taken as done today, leads to a sub- or non-optimal selection of individuals. These individuals in turn may take sub-optimal or wrong decisions leading to a non-optimal architecture and functioning of the technical system.

Thus it is still a challenge to find appropriate measures, especially finding appropriate experts or tools, in order to develop, design and/or deploy complex system architectures and more general to develop, design and/or deploy complex embedded or cyber-physical systems.

The process of determining appropriate or best-fitting measures, especially experts or tools, to take decisions during the development or maintenance of a technical system is a manual process relying on humans who possess an overview over the technical system and particularly the skills of all the members of the development team of the technical system. Of course, a knowledge base can be set up and filled with experts' skills, but this only shifts the problem because it remains a manual task that again requires the expertise to fill the knowledge base with correct skill information. Further, manually created knowledge bases are prone to outdated data, which poses an additional risk for the decision making process.

SUMMARY

An aspect relates to propose a Method and Computer-Program-Product (non-transitory computer readable storage medium having instructions, which when executed by a processor, perform actions) determining measures for the development, design and/or deployment of complex embedded or cyber-physical systems, in particular complex software architectures used therein, of different technical domains, wherein the Method and the Computer-Program-Product improve each the development, design and/or deployment of the complex embedded or cyber-physical systems and in particular the complex software architectures being included and/or used therein such that the above-discussed aspects are addressed.

The underlying idea of embodiments of the invention is to provide a method and Computer-Program-Product for improving the quality of complex embedded or cyber-physical systems and their (software) architectures by means of a sophisticated expertise or tool-significant Measure Recommendation System. This Measure Recommendation System, particularly formed by the Computer-Program-Product, is tailored to determine and provide appropriate measures to effectively improve the decision-making process during the design, development and/or deployment of systems of different technical domains by automatically providing Measure Determining Vectors.

So Proposed is a method and Computer-Program-Product each determining measures for the development, design and/or deployment of complex embedded or cyber-physical systems, in particular complex software architectures used therein, of different technical domains such that both, the method and the Computer-Program-Product automatically provide a Measure Determining Vector due to which a measure is recommended, such like an expert or a tool, who or which is appropriate to solve a specific problem in the development, design and/or deployment of the complex embedded or cyber-physical systems, in particular the complex software architectures, addressed by an issue.

The idea is to automatically derive from an Issue Tracking System <ITS>, which is designed as a Issue Tracking Database System <ITDBS> based on different kinds of data sources, such as JIRA, GitHub or Whiteboard, and including numerous resolved issues, wherein the resolver of the issue could be an expert or a tool, and at least one unresolved issue, which has to be resolved, a resolver-related Issue Evaluation Matrix <IEM>, which could be for instance an expertise matrix or tool-significant matrix, that defines for resolvers of the issues (i.e. potential experts or appropriate tools) with regard to recommending measures how experienced the said persons (the experts) or how appropriate the said tools are for certain topics.

The matrix itself is automatically filled with data extracted from the Issue Tracking System. With regard to the unresolved issue and for every new decision to be taken accordingly, the best suited expert, i.e. architect, designer or developer, or the most appropriate tool will be determined by using the matrix. An example of such a matrix is depicted in FIG. 8, which shows an excerpt of an expertise matrix derived from a publicly available Issue Tracking Database System for an Open Source Software System.

To reach the addressed goal
(i) the Issue Tracking Database System, which maintains all issues relevant for the development, design and/or deployment of the complex embedded or cyber-physical systems and in particular the complex software architectures,
(ii) the Measure Recommendation System, which analyzes and processes the issues and finally deliver recommendations respectively determine the measures based on the Measure Determining Vector,
(iii) a Knowledge Database System <KDBS> keeping all the relevant information that is required for the Measure Recommendation System as well as the results produced by the Measure Recommendation System and
(iv) an Ontology Database System <ODBS>, such like DBpedia, that is used to determine terms that are relevant in the context of the expertise or tool-significance form a functional unit (cf. FIGS. 1A and B 1).

The Issue Tracking Database System (based upon https://en.wikipedia.org/wiki/Issue_tracking_system in the revision of Jan. 18, 2018), sometimes also referred to as: trouble ticket system, support ticket system, request management system or incident ticket system, is a computer software package that manages and maintains lists of issues, as needed by an organization. Issue Tracking Database Systems are commonly used in an organization to create, update, and resolve reported customer issues, or even issues reported by that organization's other employees. A support ticket should include vital information for the account involved and the issue encountered. An Issue Tracking Database System often also contains according to https://en.wikipedia.org/wiki/Knowledge_base in the revision of Feb. 13, 2018 information on each customer, resolutions to common problems, and other peripheral information. An Issue Tracking Database System is similar to a "Bug Tracker". Often a software company will use both. Some "Bug Trackers" are capable of being used as an Issue Tracking Database System and vice versa. The consistent use of an Issue or Bug Tracking Database System is considered as one of the "hallmarks of a good software team".

Saying this, the idea can be applied to the design, development and/or deployment of any technical system that uses some kind of issue tracking, not only limited to the Issue Tracking Database System.

The proposed approach, which is followed with the teaching according to embodiments of the invention, lies therein that in an Issue Evaluating Phase as a preliminary step, in which data of resolved issues is extracted from an Issue Tracking Database System (e.g. JIRA and GitHub issue tracker) and evaluated, and in a Measure Determining Phase as a subsequent step, in which measures, such like experts or tools, for newly unresolved issues inputted or inserted into the Issue Tracking Database System, are recommended or determined, the Issue Tracking Database System is used in order to consider the history of decisions. The use of Issue Tracking Database Systems for managing system-related issues is becoming popular both in industrial settings as well as in open source system projects. The decisions—in spite of being important for system architectures and the development, design and/or deployment—are often not explicitly documented for technical systems, whereas decisions in such issue trackers [7] are implicitly captured. A decision might be the selection of a particular component due to adequate physical properties or the application of a certain pattern to address a specific problem.

the overload of information in large systems is addressed (semi-)automatically by at least partially applying a machine learning algorithm to identify decisions in the Issue Tracking Database System and to classify them into categories.

a Knowledge Database System is used to store, manage and provide the relevant information.

Finally, the proposed approach is that in the Measure Determining Phase an algorithm uses the Knowledge Database System to recommend respective determine measures to resolve the new unresolved issues.

With this approach efforts to quantify expertise or tool-significance by analyzing decisions made by architects, designers and/or developers in their past for ongoing projects with the help of an Issue Evaluation Matrix <IEM>.

This allows one
to further search within the matrix to find people with relevant expertise or tools with appropriate significance so as to deal with specific concerns in a quantitative manner in order to foster a faster development, design of technical systems by choosing the right experts or tools for the right problem.

to find experts or tools to solve a problem in complex technical systems by using the Issue Tracking Database System thereby addressing the overload of information by a periodic automatic extraction and categorization of decisions.

to maintain relevant information being required in the Knowledge Database System.

to periodically access the Issue Tracking Database System and to copy the content into the Knowledge Database System in a flexible manner using appropriate data structures, thereby maintaining the Knowledge Database System automatically.

to detect decisions in the imported issues from the Issue Tracking Database System.

to classify detected decisions.

to determine architectural elements in the decisions by either using a static knowledge base or by accessing the Ontology Database System, such like DBpedia.

to determine the relevance of architectural elements in a decision.

to extract the "assignee" from the issue to populate the Knowledge Database System with individuals—the experts.

to build the Issue Evaluation Matrix, e.g. an expert matrix or a tool matrix concerning tool-significances, specifying and quantifying the expertise of individuals or the tool-significances with regard to relevant elements.

to match new decisions in the inputted or inserted unresolved issues with the matrix to determine and rank experts/tool-significances, who/which are suited for solving the decision.

BRIEF DESCRIPTION

Some of the embodiments will be described in detail, with reference to the following figures, wherein like designations denote like members, wherein:

FIG. 1A shows the basic structure of a Measure Recommendation System determining and providing appropriate measures to effectively improve the decision-making process during the design, development and/or deployment of systems of different technical domains;

DETAILED DESCRIPTION

Figure 1B:
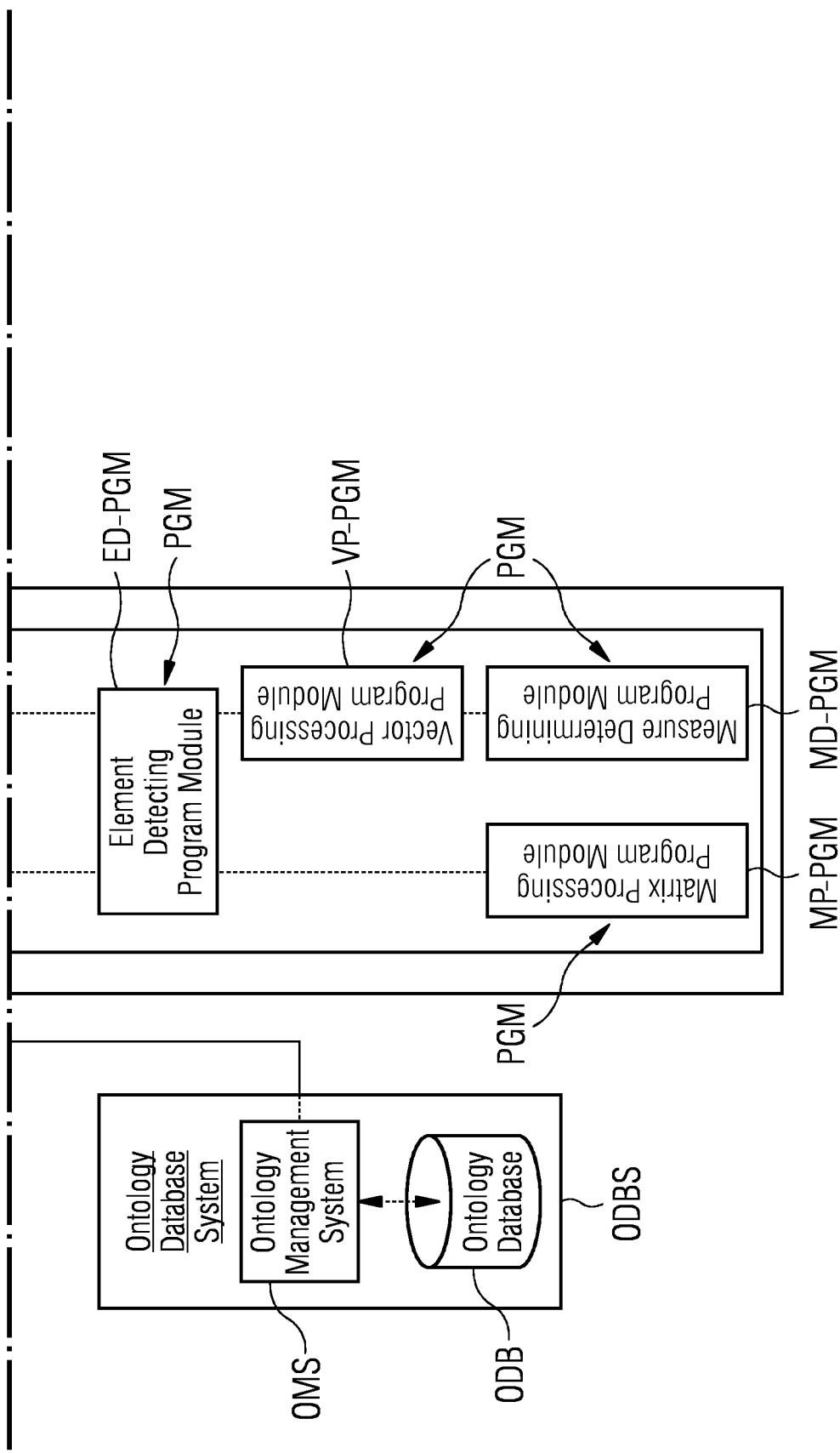
FIG. 1B shows the basic structure of a Measure Recommendation System determining and providing appropriate measures to effectively improve the decision-making process during the design, development and/or deployment of systems of different technical domains.

FIGS. 1A and B depict the basic structure of a Measure Recommendation System MRS determining and providing an appropriate measure MEA to effectively improve the decision-making process during the design, development and/or deployment of complex software architectures used in complex embedded or cyber-physical systems of different technical domains. To do so the Measure Recommendation System MRS is connected or assigned to a Issue Tracking Database System ITDBS, a Knowledge Database System KDBS and a Ontology Database System ODBS thereby forming a functional unit with these systems in order to determine the measure MEA.

The Issue Tracking Database System ITDBS comprises an Issue Tracking Management System ITMS and Issue Tracking Database ITDB, in which either resolved issues $I_{rs}$ or unresolved issues $I_{urs}$, being each structured or unstructured so for instance regarding an issue type and issue format, are put in. This inputting (input) or inserting (insertion) of the issues $I_{rs}$, $I_{urs}$ and also the lateron outputting from the Issue Tracking Database ITDB is done via the Issue Tracking Management System ITMS. The issues $I_{rs}$, $I_{urs}$ can come from different data sources such as (a) JIRA, which is a proprietary issue tracking product allowing bug tracking and agile project management, (b) GitHub, which is a development platform to host and review code, to manage projects and to build or create software, and (c) whiteboard presentations such as notes and drawings.

Comparable structures have the Knowledge Database System KDBS and the Ontology Database System ODBS. So the Knowledge Database System KDBS, which serves as a kind of a access option of data for the Measure Recommendation System MRS regarding access data being at least temporarily buffered and read, comprises a Knowledge Management System KMS and a Knowledge Database KDB, in which the access data is buffered and read. This buffering and reading is done via the Knowledge Management System KMS.

And the Ontology Database System ODBS, which serves as an access database for the Measure Recommendation System MRS regarding ontology-based general data GDA and is designed as DBpedia, comprises a Ontology Management System OMS and a Ontology Database ODB, in which the data GDA is put in and stored. The DBpedia Database (a) is a crowd-sourced community effort to extract structured content from the information created in various Wiki-related media projects, (b) stores knowledge in a machine-readable form and provides a means for information to be collected, organized, shared, searched and utilized and (c) is served as linked data thereby revolutionizing the way applications interact with the Web. The inputting (input) or inserting (insertion) and storing of the general data as well as the lateron outputting of the general data GDA is done via the Ontology Management System OMS.

To serve the functional unit, the Measure Recommendation System MRS is designed as a Computer-Program-Product CPP comprising primarily a non-transitory, processor-readable Storage Medium STM having processor-readable program-instructions of Program Modules PGM for the measure determination stored therein and a Processor PRC connected with the storage medium STM executing the processor-readable program-instructions to determine the measure MEA. Moreover the Computer-Program-Product CPP comprises a User Interface UI, which is connected to the Processor PRC, for outputting the measure MEA.

In order to determine and provide the measure MEA, the Processor PRC is operated in two operation modes in which an Issue Evaluating Phase IEP and a Measure Determining Phase MDP are carried out. In these operation modes carrying out the two phases the Processor PRC has access in the context of the functional unit the Measure Recommendation System MRS is formed with the Issue Tracking Database System ITDBS, the Knowledge Database System KDBS and the Ontology Database System ODBS via the Issue Tracking Management System ITMS to the data in the Issue Tracking Database ITDB, via the Ontology Management System OMS to the data in the Ontology Database ODB and via the Knowledge Management System KMS to the data in the Knowledge Database KDB.

In the operation mode concerning the Issue Evaluating Phase IEP, the Processor PRC is executing the processor-readable program-instructions of various Program Modules PGM stored in the non-transitory, processor-readable Storage Medium STM stepwise. So firstly (first step) IEP-related instructions of an Importing Program Module I-PGM, secondly (second step) IEP-related instructions of a Decision Detection Program Module DD-PGM, thirdly (third step) IEP-related instructions of a Element Detecting Program Module ED-PGM and fourthly (fourth step) IEP-related instructions of a Matrix Processing Program Module MP-PGM.

Figure 2:
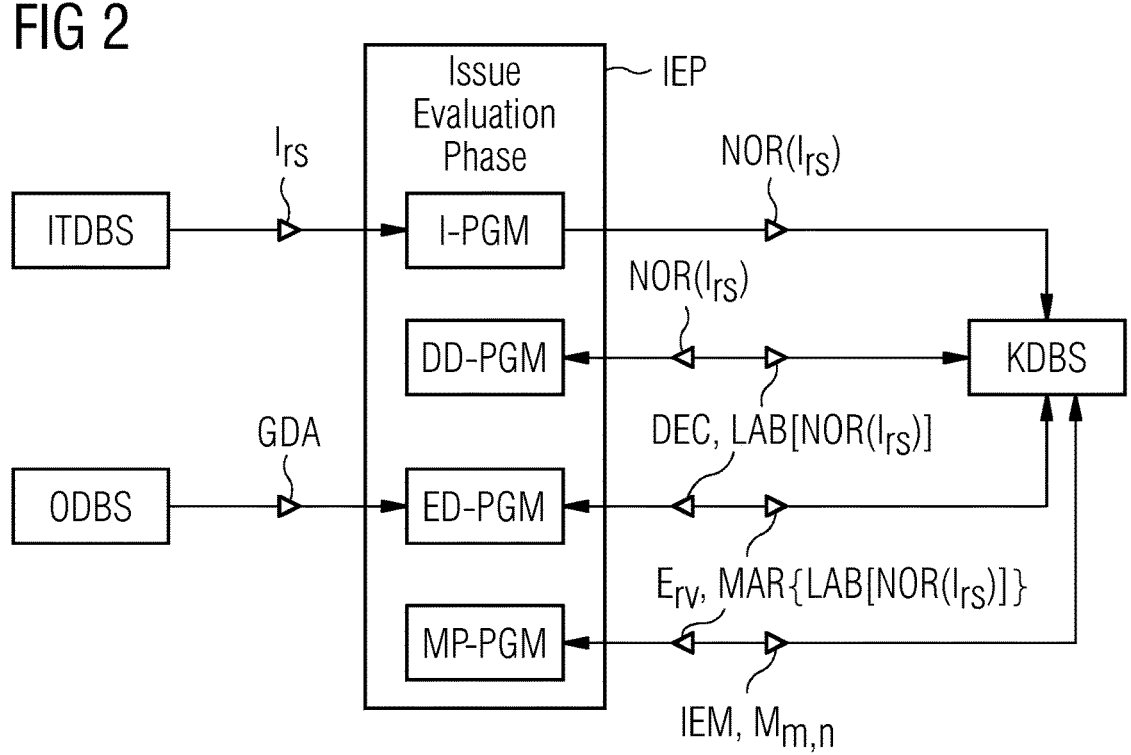
FIG. 2 shows the basic structure of an Issue Evaluation Phase used in the Measure Recommendation System as depicted in FIGS. 1A and B.
Figure 3:
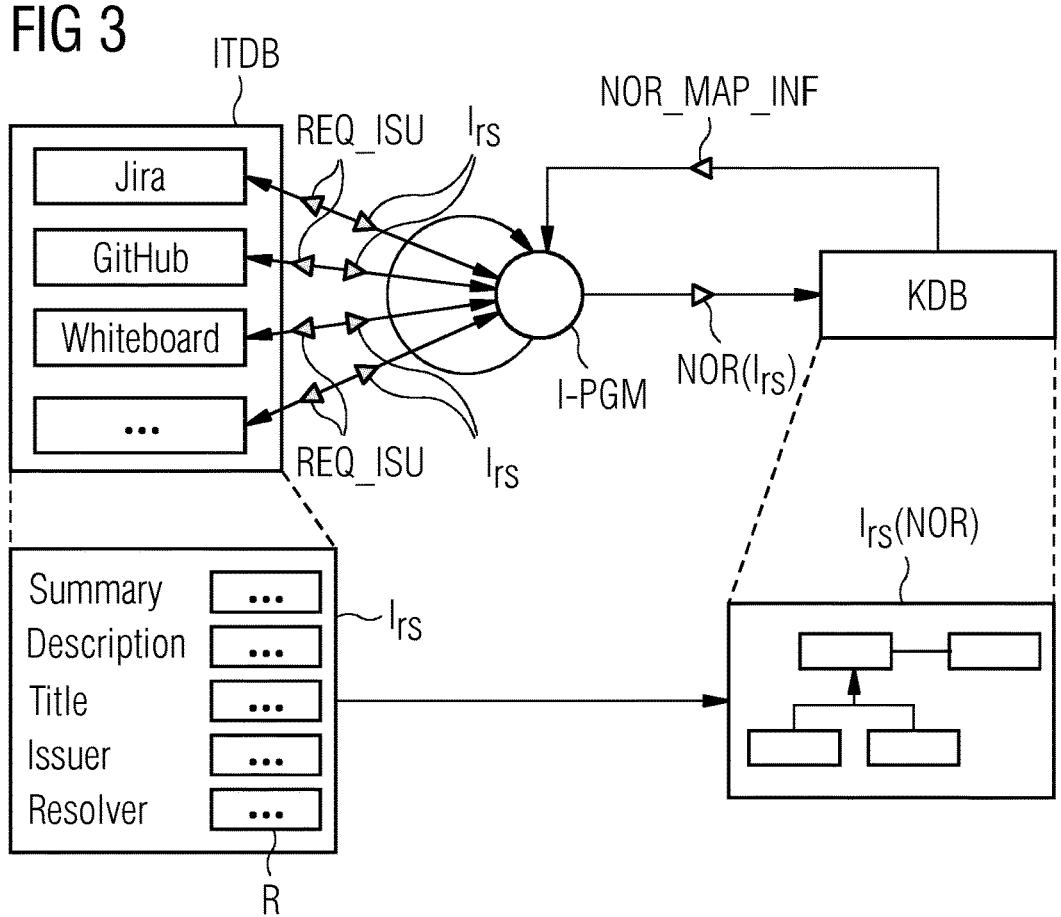
FIG. 3 shows the operating principle of an Importing Program Module used in the Measure Recommendation System as depicted in FIGS. 1A and B during the Issue Evaluation Phase.
Figure 4:
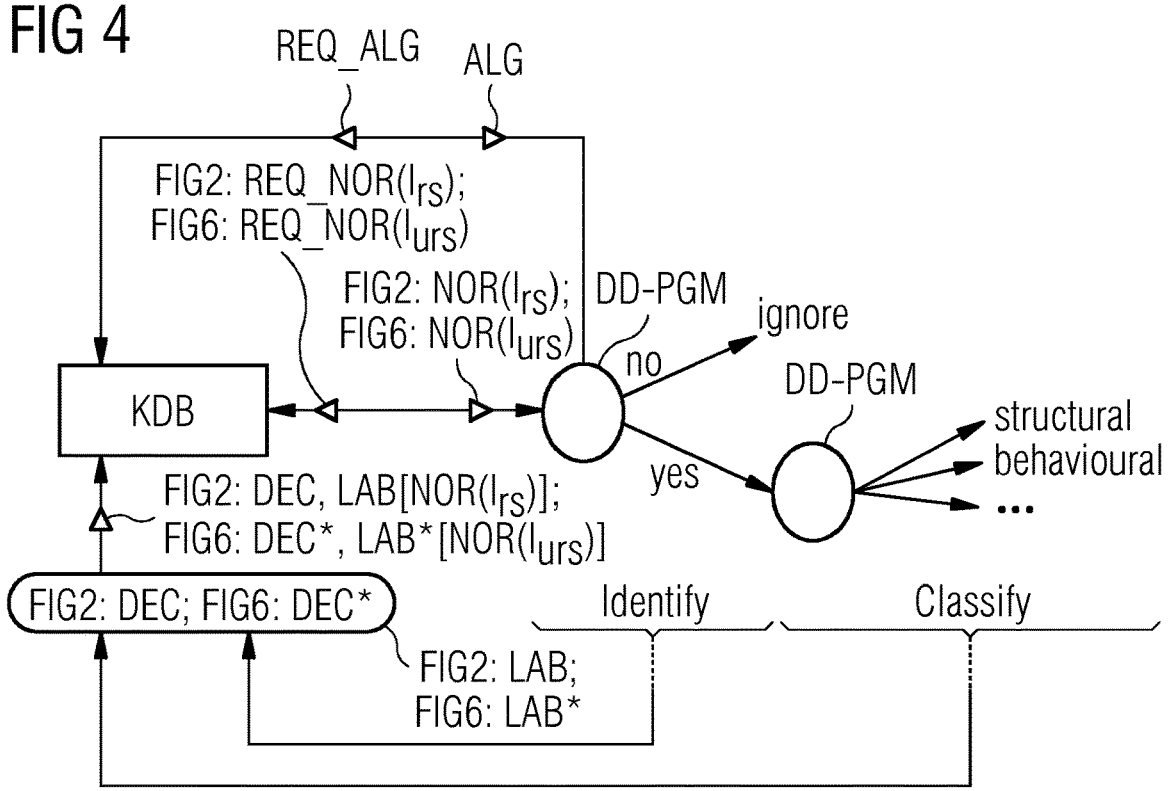
FIG. 4 shows the operating principle of a Decision Detection Program Module used in the Measure Recommendation System as depicted in FIGS. 1A and B.
Figure 5:
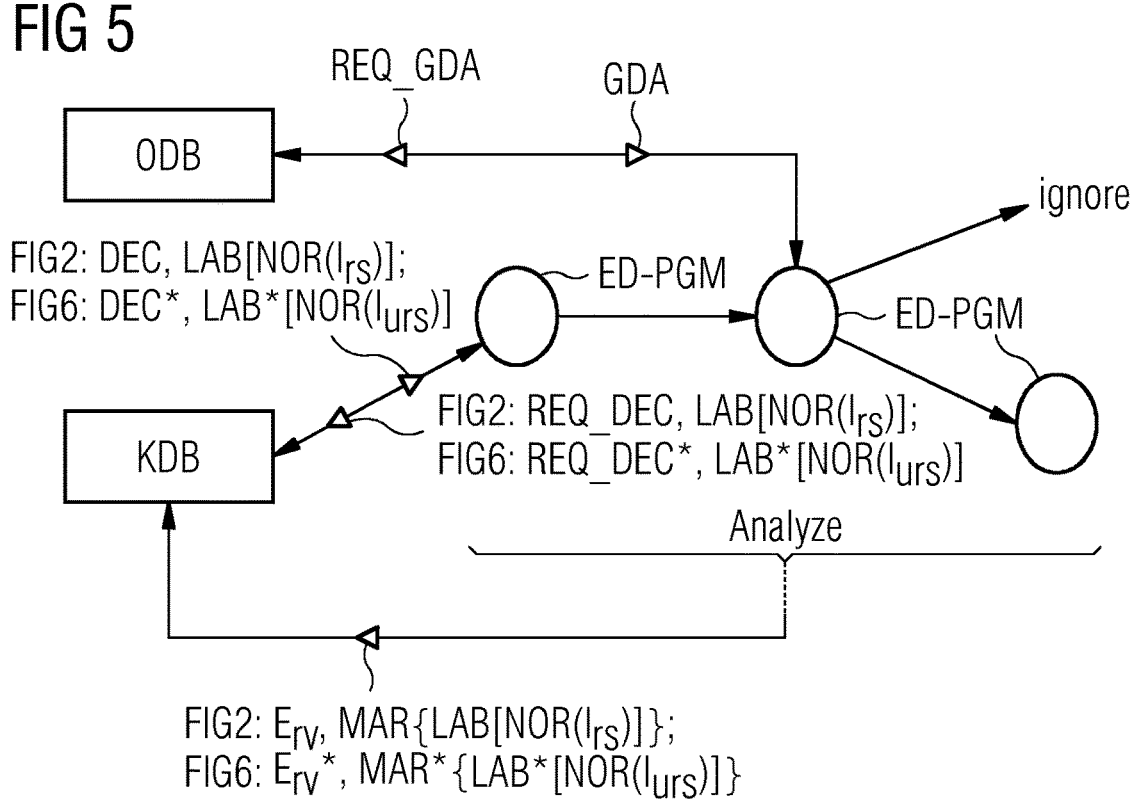
FIG. 5 shows the operating principle of an Element Detecting Program Module used in the Measure Recommendation System as depicted in FIGS. 1A and B.
Figure 8:
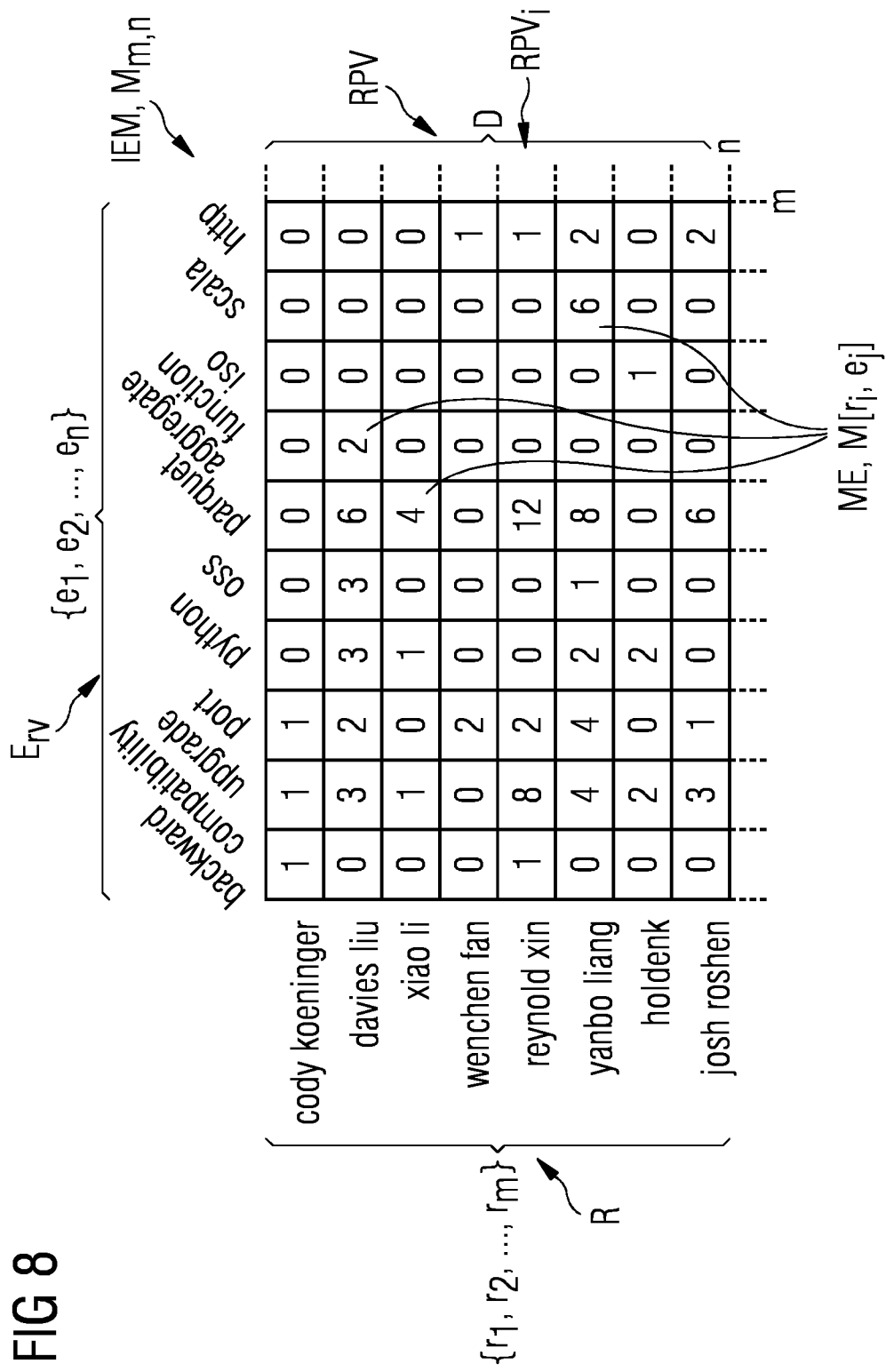
FIG. 8 shows an excerpt of an Issue Evaluation Matrix.

While FIG. 2 shows the basic structure (a general overview) of the Issue Evaluation Phase IEP encompassing all the four steps, the single steps of the Issue Evaluation Phase IEP are depicted in FIGS. 3, 4, 5 and 8, wherein FIG. 3 shows a first IEP-step, FIG. 4 a second IEP-step, FIG. 5 a third IEP-step and FIG. 8 a fourth IEP-step.

In the operation mode concerning the Measure Determining Phase MDP, the Processor PRC is executing the processor-readable program-instructions of various Program Modules PGM stored in the non-transitory, processor-readable Storage Medium STM stepwise. So firstly MDP-related instructions of the Importing Program Module I-PGM, secondly MDP-related instructions of the Decision Detection Program Module DD-PGM, thirdly MDP-related instructions of the Element Detecting Program Module ED-PGM, fourthly MDP-related instructions of a a Vector Processing Program Module VP-PGM and fifthly MDP-related instructions of a Measure Determining Program Module MD-PGM.

Figure 6:
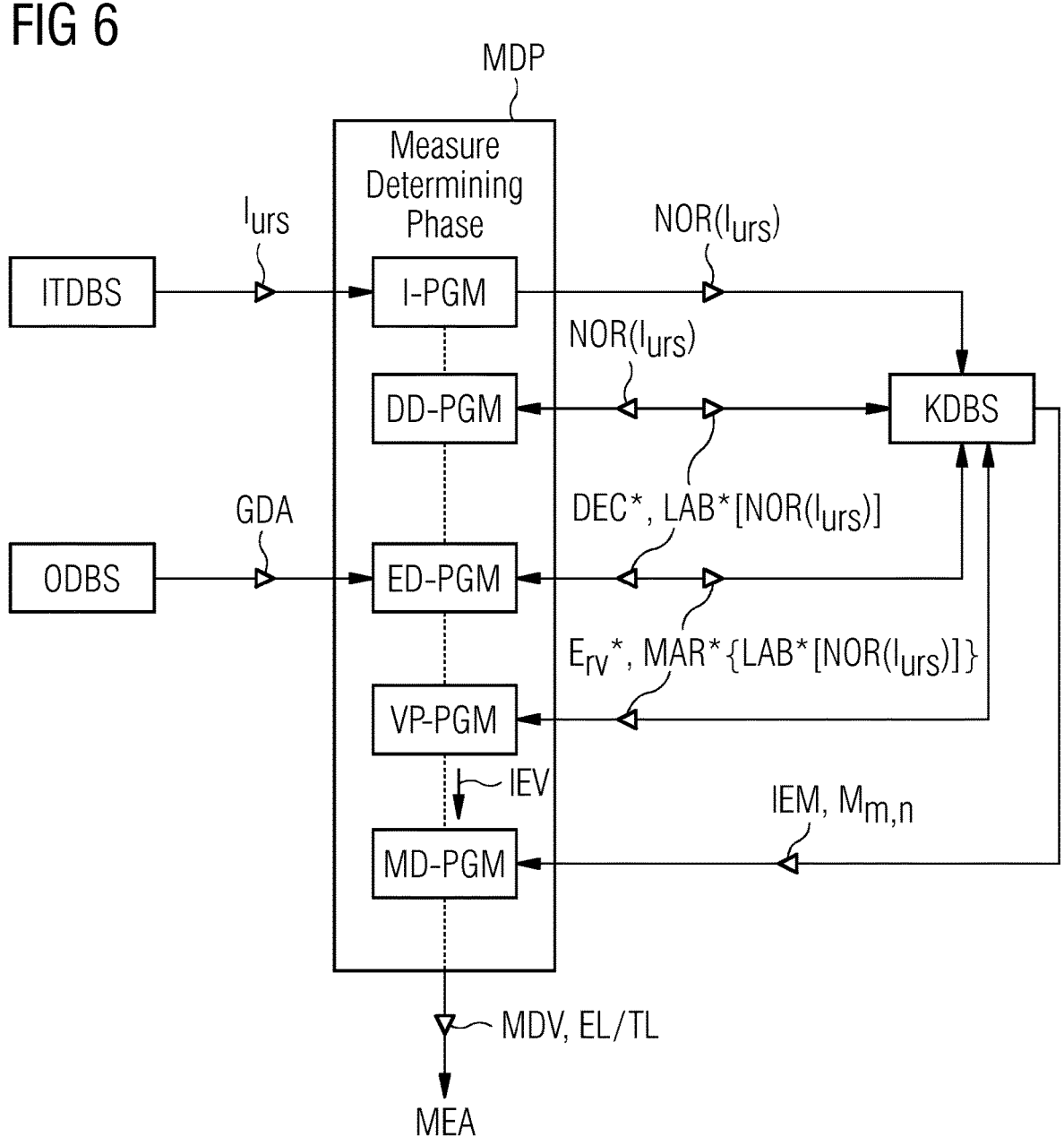
FIG. 6 shows the basic structure of a Measure Determining Phase used in the Measure Recommendation System as depicted in FIGS. 1A and B.
Figure 7:
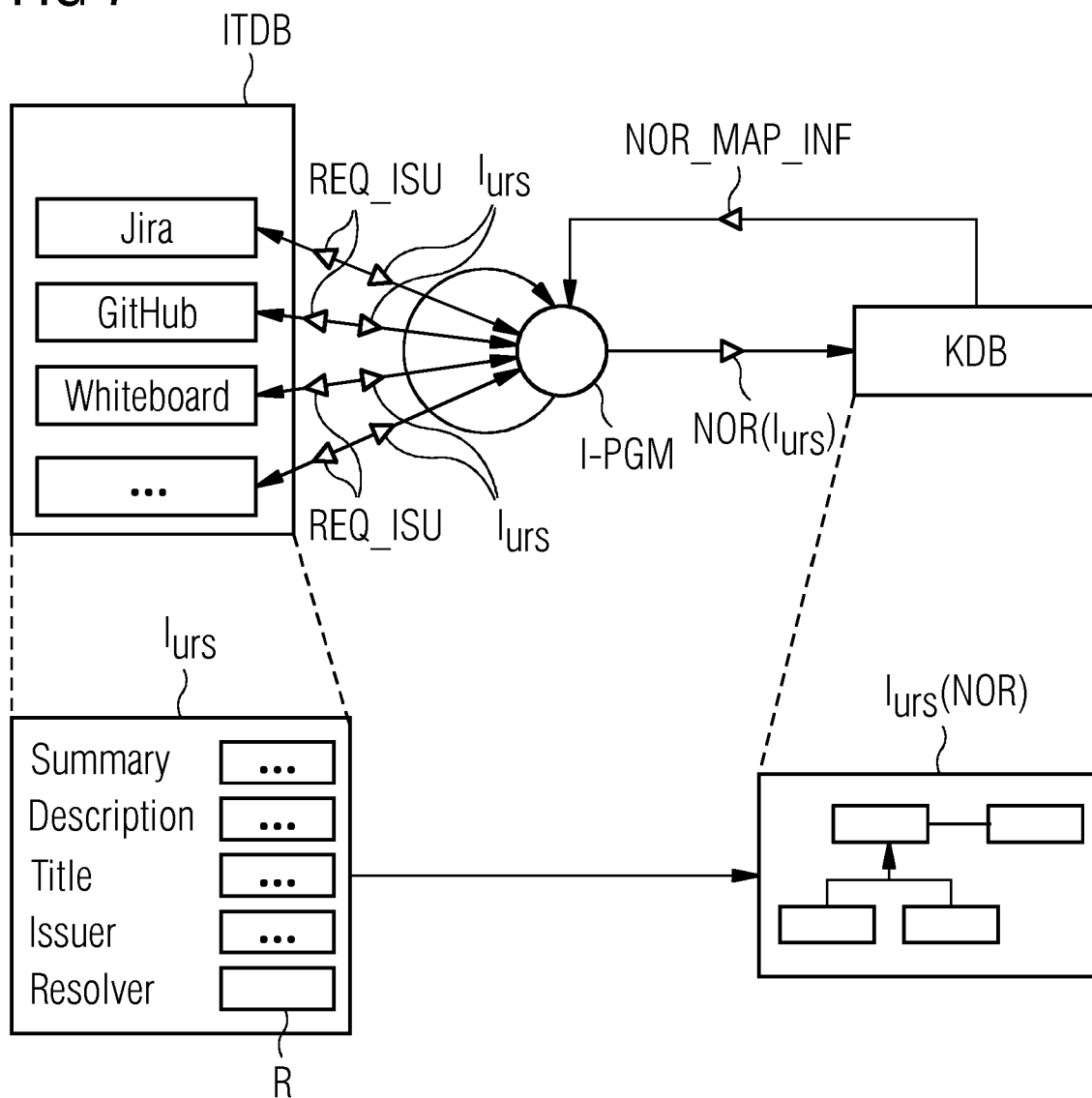
FIG. 7 shows the operating principle of the Importing Program Module used in the Measure Recommendation System, as depicted in FIGS. 1A and B, during the Measure Determining Phase.
Figure 9:
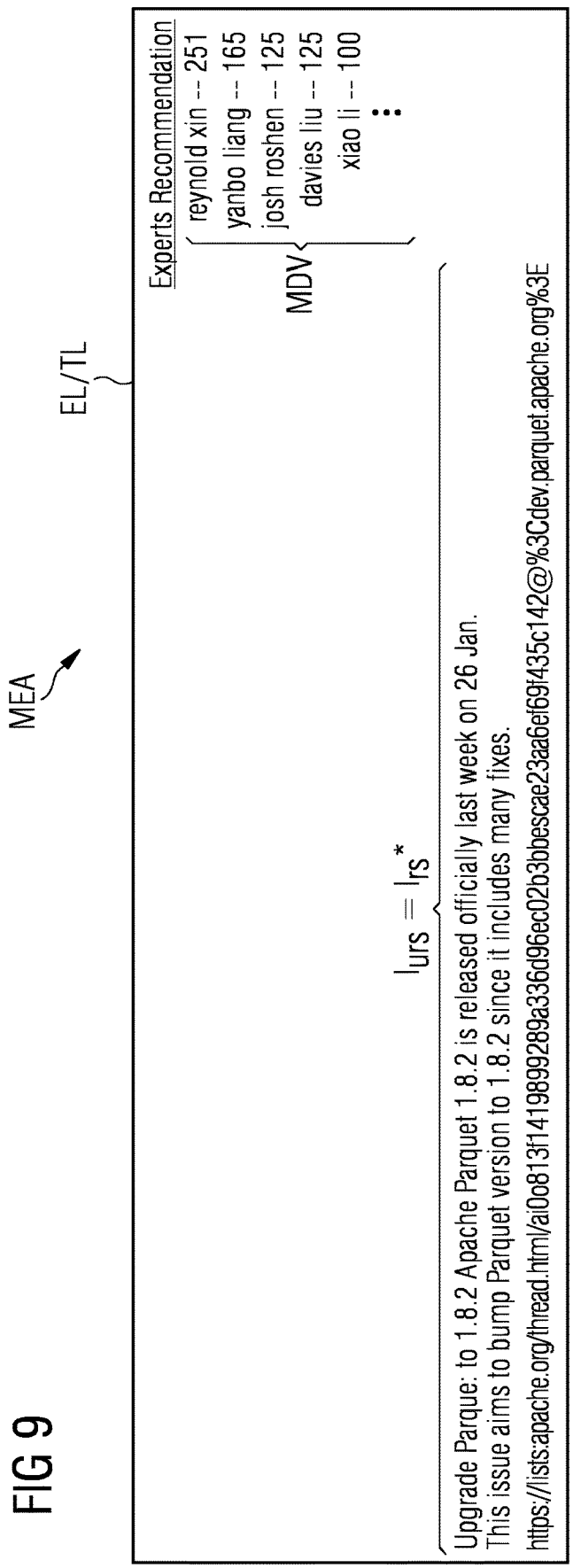
FIG. 9 shows an excerpt of an Expert/Tool List.

While FIG. 6 shows the basic structure (a general overview) of the Measure Determining Phase MDP encompassing all the five steps, the single steps of the Measure Determining Phase MDP are depicted in FIGS. 7, 4, 5 and 9, wherein FIG. 7 shows a first MDP-step, FIG. 4 a second MDP-step, FIG. 5 a third MDP-step, FIG. 6 a fourth MDP-step and FIG. 9 a fifth MDP-step.

Regarding the stepwise applying of the Importing Program Module I-PGM, the Decision Detection Program Module DD-PGM and the Element Detecting Program Module ED-PGM both phases IEP, MDP are identical.

The Issue Evaluation Phase IEP with its single IEP-steps is now described according to the depiction in the FIG. 1 and in accordance to general overview of in the FIG. 2.

In the first IEP-step, in which the Processor PRC of the Measure Recommendation System MRS respectively the Computer-Program-Product CPP accesses the Knowledge Database System KDBS and the Issue Tracking Database System ITDBS and executes the Importing Program Module I-PGM, the resolved issues $I_{rs}$ stored in the Issue Tracking Database ITDB of the Issue Tracking Database System ITDBS are edited and evaluated such that the resolved issues $I_{rs}$ become normalized. This means that the issues $I_{rs}$ are subjected to a normalization procedure NOR being represented by $I_{rs}$(NOR) [cf. second depiction in FIG. 3]. The result of the normalization procedure NOR are normalized resolved issues NOR($I_{rs}$), which are stored in the Knowledge Database KDB.

FIG. 3 shows in a two-part-depiction how the first IEP-step is carried out in detail [first depiction] and how the structure of the resolved issues $I_{rs}$ looks like before and after the normalization procedure NOR [second depiction].

According to the second depiction the resolved issues $I_{rs}$ stored in the Issue Tracking Database ITDB of the Issue Tracking Database System ITDBS are commonly unstructured although it is also possible that they are already stored in a structured way. Each resolved issue $I_{rs}$ contains at least one identification data field concerning at least a "Resolver"-attribute R and one content related data field concerning at least "Summary"- and/or "Description"-attributes. On the left side it is depicted the resolved issue $I_{rs}$ before applying the normalization procedure NOR, and on the right side, the resolved issue $I_{rs}$ after applying the normalization procedure NOR. This, in the FIG. 3, illustrated mapping between the input format on the left side and the normalized format in the Knowledge Database System can flexibly be controlled.

According to the first depiction it is depicted explicitly the Processor-based data accessing the Knowledge Database System KDB and the Issue Tracking Database ITDB as well as the Processor-based executing of the Importing Program Module I-PGM to carry out the first IEP-step. Consequently, due to a cyclic or periodical access to the Issue Tracking Database ITDB by addressing a Issue Request REQ_ISU to the Issue Tracking Database ITDB, the resolved issues $I_{rs}$ are read or extracted from the Issue Tracking Database ITDB. Besides the periodical or cyclic import of the resolved issues $I_{rs}$ by extracting or reading it is alternatively also possible to trigger the issue import by newly arriving issues from the different data sources, e.g. JIRA, GitHub, Whiteboard, etc.

In addition by executing the Importing Program Module I-PGM normalization mapping information NOR_MAP_INF requested from the Knowledge Database KDB is used. With the requested normalization mapping information NOR_MAP_INF and the extracted resolved issues $I_{rs}$ the normalization procedure NOR, already mentioned in the context of the description of the FIG. 2, is carried out. Consequently, the normalization procedure NOR provides the normalized resolved issues NOR($I_{rs}$), which are stored in the Knowledge Database KDB.

The first IEP-step carried out by executing the Importing Program Module I-PGM as an extract-transform-load component of the Computer-Program-Product is not only a step, by which existing issues are imported. It is also a step, by which newly created issues are synchronized with the Knowledge Database System KDBS.

In the second IEP-step, in which the Processor PRC of the Measure Recommendation System MRS respectively the Computer-Program-Product CPP accesses the Knowledge Database System KDBS and executes the Decision Detection Program Module DD-PGM, firstly decisions DEC being inherent at least partially in the normalized resolved issues NOR($I_{rs}$) are identified and classified into categories by a machine learning algorithm and secondly the normalized resolved issues NOR($I_{rs}$) being identified and classified regarding the decisions DEC are provided with labels LAB and stored in the Knowledge Database KDB.

By this second IEP-step those normalized resolved issues NOR($I_{rs}$) are filtered for reflecting decisions DEC. This is done by the machine learning algorithm, which is a two-phase supervised algorithm based on an approach comprising the following two phases:
a) Decisions DEC are automatically detected from the normalized resolved issues NOR($I_{rs}$) [phase "Identify"; cf. FIG. 4].
b) The identified decisions DEC are automatically classified into different categories such as structural, behavioral, and non-existence decisions [phase "Classify"; cf. FIG. 4]. This is the first part of the second IEP-step.

It is proposed to use a linear support vector machine algorithm in order to automatically categorize the decisions DEC according to the aforementioned categories. However, it should be also noted that other kinds of algorithms are not excluded.

There is a training phase for each type of input source (e.g. JIRA), wherein the identification of the normalized resolved issues NOR($I_{rs}$) is trained with some subset of data. Afterwards the identification can be applied to data sources of that type. A high accuracy can be achieved if the machine learning model is trained accordingly.

In the second part of the second IEP-step the normalized resolved issues NOR($I_{rs}$) are marked with a label LAB (they are respectively labeled) either as a "decision" or "not a decision". The normalized NOR, decision-labeled DEC, LAB issues DEC, LAB[NOR($I_{rs}$)] and their determined decision categories are stored in the Knowledge Database System KDB.

FIG. 4 shows based on and referred to the FIG. 2 the detailed carrying out of the two-part-related second IEP-step. So it is depicted explicitly the Processor-based data accessing the Knowledge Database KDB and the Processor-based executing of the Decision Detecting Program Module DD-PGM to carry out the second IEP-step. Consequently, due to an access to the Knowledge Database KDB by addressing firstly an Algorithm Request REQ_ALG and secondly Normalized Resolved Issue Requests REQ_NOR ($I_{rs}$) to the Knowledge Database KDB an algorithm ALG respectively the normalized resolved issues NOR($I_{rs}$) are read or extracted from the Knowledge Database KDB.

In addition by executing the Decision Detecting Program Module DD-PGM and according to the first part of the second IEP-step the two-phase supervised machine learning algorithm with the two phases, the phase "Identify" and the phase "Classify", is applied to the normalized resolved issues NOR($I_{rs}$) in order to detect automatically in the phase "Identify" the decisions DEC from the normalized resolved issues NOR($I_{rs}$) and to classify automatically in the phase "Classify" identified respectively detected decisions DEC into different categories such as "structural", "behavioral", etc. and non-existent decisions depicted as "ignore".

Moreover according to the second part of the second IEP-step those normalized resolved issues NOR($I_{rs}$), the decision DEC was assigned due to the two-phase supervised machine learning algorithm with the phase "Identify" and the phase "Classify", are marked with the label LAB. These normalized, decision-labeled issues DEC, LAB[NOR($I_{rs}$)] are then stored in the Knowledge Database System KDB in the course of the Processor's PRC access to the Knowledge Database KDB.

So the FIG. 4 shows the filtering and classification of the normalized resolved issues NOR($I_{rs}$). If an issue is labeled as a decision, then it is processed in subsequent steps.

In the subsequent third IEP-step, in which the Processor PRC of the Measure Recommendation System MRS respectively the Computer-Program-Product CPP accesses the Ontology Database System ODBS, with using the "DBpedia"-ontology, and the Knowledge Database System KDBS and executes the Element Detecting Program Module ED-PGM, the content related data fields of the normalized, decision-labeled issues DEC, LAB[NOR($I_{rs}$)] are analyzed. This analysis happens in such a way that firstly on the basis of the general data GDA stored in the Ontology Database ODB of the Ontology Database System ODBS Relevant Elements $E_{rv}$ are determined and secondly the normalized, decision-labeled issues DEC, LAB[NOR($I_{rs}$)], which are used to determine the Relevant Elements $E_{rv}$, are provided with markers MAR and stored in the Knowledge Database KDB (cf. FIG. 5).

By this third IEP-step the textual description of the normalized, decision-labeled issues DEC, LAB[NOR($I_{rs}$)], e.g. the "Summary" and "Description" attributes of the resolved issues $I_{rs}$ according to the depiction in the FIG. 3 is analyzed and the Relevant Elements $E_{rv}$ determined within the description are marked in the Knowledge Database KDB. This means that normalized, decision-labeled, element-marked issues $E_{rv}$, MAR{LAB[NOR($I_{rs}$)]} are stored in the Knowledge Database KDB. So in summary it can be said that by this third IEP-step the Relevant Elements are extracted from the textual description of the normalized, decision-labeled issues and the normalized, decision-labeled, element-marked issues are persisted in the Knowledge Database KDB.

The Relevant Elements $E_{rv}$ are topics such as selected hardware components, architectural styles, patterns, components, technologies, and so on. For this analysis the usage of the broad cross-domain Ontology Database ODB, like DBpedia, is suggested in order to determine the Relevant Elements $E_{rv}$. Instead of DBpedia as the broad cross-domain Ontology Database ODB there are also other sources possible.

FIG. 5 shows based on and referred to the FIG. 2 the detailed carrying out of the third IEP-step. So it is depicted explicitly the Processor-based data accessing the Ontology Database ODB and the Knowledge Database KDB and the Processor-based executing of the Element Detecting Program Module ED-PGM to carry out the third IEP-step. Consequently, first due to an access to the Knowledge Database KDB by addressing firstly Normalized, Decision-Labeled Issue Requests REQ_DEC, LAB[NOR($I_{rs}$)] to the Knowledge Database KDB the normalized, decision-labeled issues DEC, LAB[NOR($I_{rs}$)] are read or extracted from the Knowledge Database KDB. Then, secondly due to an access to the Ontology Database ODB by addressing a General Data Request REQ_GDA to the Ontology Database ODB the general data GDA are read or extracted from the Ontology Database ODB.

In addition by executing the Element Detecting Program Module ED-PGM the analysis is done on the basis of the normalized, decision-labeled issues DEC, LAB[NOR($I_{rs}$)] and the general data GDA. The result of the analysis could be either the determination of the Relevant Elements E, and the corresponding markers MAR of the normalized, decision-labeled issues DEC, LAB[NOR($I_{rs}$)] or the determination of non-existing Relevant Elements depicted as "ignore". These normalized, decision-labeled, element-marked issues $E_{rv}$, MAR{LAB[NOR($I_{rs}$)]} are then stored in the Knowledge Database System KDB in the course of the Processor's PRC access to the Knowledge Database KDB.

In the final fourth IEP-step, in which the Processor PRC of the Measure Recommendation System MRS respectively the Computer-Program-Product CPP accesses the Knowledge Database System KDBS and executes the Matrix Processing Program Module MP-PGM, the normalized, decision-labeled, element-marked issues $E_{rv}$, MAR{LAB [NOR($I_{rs}$)]}, stored in the Knowledge Database System KDB, are processed such that according to FIG. 8 an Issue Evaluation Matrix IEM, $M_{m,n}$ is created, wherein matrix elements ME, $M[r_i, e_j]$ of the Issue Evaluation Matrix IEM, $M_{m,n}$ are formed on the one hand by the "Resolver"-attributes R in the identification data fields of the normalized, decision-labeled, element-marked issues $E_{rv}$, MAR{LAB[NOR($I_{rs}$)]} and on the other hand by the Relevant Elements $E_{rv}$, determined for the normalized, decision-labeled, element-marked issues $E_{rv}$, MAR{LAB[NOR ($I_{rs}$)]} and each matrix element ME, $M[r_i, e_j]$ is weighted by determining the relevance of the normalized, decision-labeled, element-marked issues $E_{rv}$, MAR{LAB[NOR($I_{rs}$)]} having for the matrix element ME, $M[r_i, e_j]$ the same matrix element constellation.

Determining the relevance is done—according to the depiction in the FIG. 8—by counting the number of the normalized, decision-labeled, element-marked issues $E_{rv}$, MAR{LAB[NOR($I_{rs}$)]} having for the matrix element ME, $M[r_i, e_j]$ the same matrix element constellation.

By this fourth IEP-step according to the depiction in the FIG. 8 the Issue Evaluation Matrix IEM, $M_{m,n}$ is created, which can be an Expertise Matrix containing experts (resolver) for dedicated issues or a Tool-Significance Matrix. For each decision DEC, the marked LAB, MAR Relevant Elements $E_{rv}$, $E_{rv}\{e_1, e_2, \ldots, e_n\}$ and the resolver R, R$\{r_1, r_2 \ldots r_m\}$, who resolved the corresponding issue $I_{rs}$ in the Issue Tracking Database System ITDBS are inserted into the Matrix IEM, $M_{m,n}$, which is then persisted in the Knowledge Database KDB of the Knowledge Database System KDBS for subsequent use.

The Issue Evaluation Matrix IEM, $M_{m,n}$ shown in the FIG. 8 is an excerpt of the Expertise matrix for a sample dataset.

The resolvers R, R$\{r_1, r_2 \ldots r_m\}$ are either experts, given by their names, or tools with their tool-significance regarding the development, design and/or deployment of the complex embedded or the cyber-physical systems, which for instance use complex software architectures, used therein, of the different technical domains.

An expertise profile of the resolvers R, R$\{r_1, r_2 \ldots r_m\}$ in the depicted Issue Evaluation Matrix IEM, $M_{m,n}$ according to the FIG. 8 is represented as rows and the Relevant Elements $E_{rv}$, $E_{rv}\{e_1, e_2, \ldots, e_n\}$ as columns in the matrix. This expertise profile is nothing else than a Resolver Profile Vector RPV.

Let be:
R=$\{r_1, r_2, r_3, \ldots, r_m\}$: the set of Resolvers;
$E_{rv}$=$\{e_1, e_2, e_3, \ldots, e_n\}$: the set of Relevant Elements;
$M_{m,n}$=R×$E_{rv}$: the matrix which captures the expertise of the experts or the significance of the tools;
Experience/Significance Atom <ESA>: a cell $M[r_i,e_j]$ in $M_{m,n}$ represents an elementary atom of experience/significance;
Resolver Profile Vector RPV: each row $M[\ldots_i, \ldots_j]$ within the matrix $M_{m,n}$.
Each element $M[r_i,e_j]$ in $M_{m,n}$ represents the Experience/Significance Atom <ESA>.

By implementing a decision that targets specific elements, individuals gain experience related to the respective Experience/Significance Atom. The count of each Experience/Significance Atom for an individual indicates the experience level. That is, the higher the experience level of an individual for the Experience/Significance Atom $M[r_i,e_j]$ is, the more experience in handling concerns related to the corresponding Relevant Element an individual has. The experience level of an individual for the Experience/Significance Atom can also be zero, which indicates that the person has not implemented a decision pertaining to that Experience/Significance Atom and quantifies that the person has no experience on that topic.

Moreover, an individual can also have expertise in zero or more Experience/Significance Atoms.

Each row $M[\ldots_i, \ldots_j]$ within the matrix $M_{m,n}$ represents the Resolver Profile Vector RPV for a particular individual $[\ldots_i, \ldots_j]$. A Resolver's name is extracted, for instance, from the "assignee" attribute of an issue, which represents the Resolver who resolved this issue and gained experience. Using this expertise profile respectively the Resolver Profile Vector RPV, the experience of individuals can be quantitatively assessed corresponding to each Relevant Element $E_{rv}$, $E_{rv}\{e_1, e_2, \ldots e_n\}$.

The higher the number of a cell within the matrix, the higher the value for the corresponding Experience/Significance Atom $M[r_i,e_j]$). Once the matrix is generated for a technical domain related project concerning the development, design and/or deployment of the corresponding complex embedded or the cyber-physical system, it is persisted in the Knowledge Database System and further used to create a recommendation list of experts respectively a list of tools, in other words an "expertList/toolList" EL/TL according to FIG. 9. With such an "expertList/toolList" it is much easier and faster to have a progress within the technical domain related project, which has at the end a competitive advantage on the global market of a technical product being developed, designed and/or deployed in the technical domain. Besides that or in addition to this, the "expertList/toolList" is sustainable useful and of economical, technical importance or beneficial with respect to the maintenance of those technical domain related systems or products.

The Measure Determining Phase MDP with its single MDP-steps is now described according to the depiction in the FIG. 1 and in accordance to general overview of in the FIG. 6.

Within the Measure Determining Phase MDP with its single MDP-steps every newly created unresolved issue $Iu_{rs}$, goes through the five MDP-steps, beginning with first MDP-step and ending with the fifth MDP-step, wherein the first MDP-step, the second MDP-step and the third MDP-step are essentially the same as the first IEP-step, the second IEP-step and the third IEP-step described above in the context of the Issue Evaluation Phase IEP.

So, in the first MDP-step, in which the Processor PRC of the Measure Recommendation System MRS respectively the Computer-Program-Product CPP accesses the Knowledge Database System KDBS and the Issue Tracking Database System ITDBS and executes the Importing Program Module I-PGM, the unresolved issue $Iu_{rs}$ stored in the Issue Tracking Database ITDB of the Issue Tracking Database System ITDBS is edited and evaluated such that the unresolved issue $Iu_{rs}$ becomes normalized. This means that the issue $I_{urs}$ is subject to a normalization procedure NOR being represented by $I_{urs}$(NOR) [cf. second depiction in FIG. 7].

The result of the normalization procedure NOR is a normalized unresolved issue NOR($I_{urs}$), which is stored in the Knowledge Database KDB.

FIG. 7 shows in a two-part-depiction how the first MDP-step is carried out in detail [first depiction] and how the structure of the unresolved issue $I_{urs}$ looks like before and after the normalization procedure NOR [second depiction].

According to the second depiction the unresolved issue $I_{urs}$ stored in the Issue Tracking Database ITDB of the Issue Tracking Database System ITDBS is commonly unstructured although it is also possible that they are already stored in a structured way. Each unresolved issue $I_{urs}$ extracted from the Issue Tracking Database ITDB contains again (as the resolved issue $I_{rs}$) at least one identification data field concerning at least a "Resolver"-attribute R and one content related data field concerning at least "Summary"- and/or "Description"-attributes. On the left side it is depicted the unresolved issue $I_{urs}$ before applying the normalization procedure NOR, and on the right side, the unresolved issue $I_{urs}$ after applying the normalization procedure NOR. This in the FIG. 7 illustrated mapping between the input format on the left side and the normalized format in the Knowledge Database System can flexibly be controlled.

According to the first depiction it is depicted explicitly the Processor-based data accessing the Knowledge Database System KDB and the Issue Tracking Database ITDB as well as the Processor-based executing of the Importing Program Module I-PGM to carry out the first MDP-step. Consequently, due to a cyclic or periodical access to the Issue Tracking Database ITDB by addressing a Issue Request REQ_ISU to the Issue Tracking Database ITDB each unresolved issue $I_{urs}$ is read or extracted from the Issue Tracking Database ITDB. Besides the periodical or cyclic import of each unresolved issue $I_{urs}$ by extracting or reading it is alternatively also possible to trigger the issue import by each newly arriving issue from the different data sources, e.g. JIRA, GitHub, Whiteboard, etc.

In addition by executing the Importing Program Module I-PGM normalization mapping information NOR_MAP_INF requested from the Knowledge Database KDB is used. With the requested normalization mapping information NOR_MAP_INF and the extracted unresolved issue $I_{urs}$ the normalization procedure NOR, already mentioned in the context of the description of the FIG. 6, is carried out. Consequently, the normalization procedure NOR provides the normalized unresolved issue NOR($I_{urs}$), which is stored in the Knowledge Database KDB.

The first MDP-step carried out by executing the Importing Program Module I-PGM as an extract-transform-load component of the Computer-Program-Product is not only a step, by which existing issues are imported. It is also a step, by which newly created issues are synchronized with the Knowledge Database System KDBS.

In the second MDP-step, in which the Processor PRC of the Measure Recommendation System MRS respectively the Computer-Program-Product CPP accesses the Knowledge Database System KDBS and executes the Decision Detection Program Module DD-PGM, firstly at least one further decision DEC* being inherent to the normalized unresolved issue NOR($I_{urs}$) is identified and classified into categories by a machine learning algorithm and secondly the normalized unresolved issue NOR($I_{urs}$) being identified and classified regarding the further decision DEC* is provided with a further label LAB* and stored in the Knowledge Database KDB.

By this second MDP-step this normalized unresolved issue NOR($I_{urs}$) is filtered that reflect the further decision DEC*. This is done by the machine learning algorithm, which is a two-phase supervised algorithm based on an approach comprising the following two phases:

a) The further Decision DEC* is automatically detected from the normalized unresolved issue NOR($I_{urs}$) [phase "Identify"; cf. FIG. 4].

b) The identified further decision DEC* is automatically classified into one category of different categories such as structural, behavioral, or a non-existence decision [phase "Classify"; cf. FIG. 4]. This is the first part of the second MDP-step.

It is proposed to use a linear support vector machine algorithm in order to automatically categorize the further decision DEC* according to one of the aforementioned categories. However, it should be also noted here that other kinds of algorithms are not excluded.

There is a training phase for each type of input source (e.g. JIRA), wherein the identification of the normalized unresolved issue NOR($I_{urs}$) is trained with some subset of data. Afterwards the identification can be applied to data sources of that type. A high accuracy can be achieved if the machine learning model is trained accordingly.

In the second part of the second MDP-step the normalized unresolved issue NOR($I_{urs}$) is marked with a further label LAB* (it is respectively labeled) either as a "decision" or "not a decision". The normalized NOR, further decision-labeled DEC*, LAB* issue DEC*, LAB*[NOR($I_{rs}$)] and the determined decision category is stored in the Knowledge Database System KDB.

FIG. 4 shows based on and referred to the FIG. 6 the detailed carrying out of the two-part-related second MDP-step. So it is depicted explicitly the Processor-based data accessing the Knowledge Database KDB and the Processor-based executing of the Decision Detecting Program Module DD-PGM to carry out the second MDP-step. Consequently, due to an access to the Knowledge Database KDB by addressing firstly the Algorithm Request REQ_ALG and secondly a Normalized Unresolved Issue Request REQ_NOR($I_{urs}$) to the Knowledge Database KDB the algorithm ALG respectively the normalized unresolved issue NOR($I_{urs}$) are read or extracted from the Knowledge Database KDB.

In addition by executing the Decision Detecting Program Module DD-PGM and according to the first part of the second MDP-step, the two-phase supervised machine learning algorithm with the two phases, the phase "Identify" and the phase "Classify", is applied to the normalized unresolved issue NOR($I_{urs}$) in order to detect automatically in the phase "Identify" the further decision DEC* from the normalized unresolved issue NOR($I_{urs}$) and to classify automatically in the phase "Classify" the identified respectively detected further decision DEC* into one category of the different categories such as "structural", "behavioral", etc. and non-existence decisions depicted as "ignore".

Moreover according to the second part of the second MDP-step the normalized unresolved issue NOR($I_{urs}$), the further decision DEC* was assigned due to the two-phase supervised machine learning algorithm with the phase "Identify" and the phase "Classify", is marked with the label LAB*. This normalized, further decision-labeled issue DEC*, LAB*[NOR($I_{urs}$)] is then stored in the Knowledge Database System KDB in the course of the Processor's PRC access to the Knowledge Database KDB.

So the FIG. 4 shows also the filtering and classification of the normalized unresolved issue NOR($I_{urs}$). If the issue is labeled as a decision, then it is processed in subsequent steps.

In the subsequent third MDP-step, in which the Processor PRC of the Measure Recommendation System MRS respectively the Computer-Program-Product CPP accesses the Ontology Database System ODBS, with using the "DBpedia"-ontology, and the Knowledge Database System KDBS and executes the Element Detecting Program Module ED-PGM, the content related data field of the normalized, further decision-labeled issue DEC*, LAB*[NOR($I_{urs}$)] is analyzed. This analysis happens in such a way that firstly on the basis of the general data GDA stored in the Ontology Database ODB of the Ontology Database System ODBS at least one further Relevant Elements $E_{rv}$* is determined and secondly the normalized, further decision-labeled issues DEC*, LAB*[NOR($I_{urs}$)], which is used to determine the further Relevant Elements $E_{rv}$*, is provided with a further marker MAR* and stored in the Knowledge Database KDB (cf. FIG. 5).

By this third MDP-step the textual description of the normalized, further decision-labeled issue DEC*, LAB*[NOR($I_{urs}$)], e.g. the "Summary" and "Description" attributes of the unresolved issue $I_{urs}$, according to the depiction in the FIG. 7, is analyzed and the further Relevant Element $E_{rv}$* determined within the description is marked in the Knowledge Database KDB. This means that a normalized, further decision-labeled, further element-marked issue $E_{rv}$*, MAR*{LAB*[NOR($I_{rs}$)]} is stored in the Knowledge Database KDB. So in summary it can be said that by this third MDP-step the further Relevant Element is extracted from the textual description of the normalized, further decision-labeled issue and the normalized, further decision-labeled, further element-marked issue is persisted in the Knowledge Database KDB.

The further Relevant Element $E_{rv}$* is a topic such as a selected hardware component, an architectural style, a pattern, a component, a technology, and so on. For this analysis the usage of the broad cross-domain Ontology Database ODB, like DBpedia, is suggested in order to determine the further Relevant Element $E_{rv}$*. Instead of DBpedia as the broad cross-domain Ontology Database ODB there are also other sources possible.

FIG. 5 shows based on and referred to the FIG. 6 the detailed carrying out of the third MDP-step. So it is depicted explicitly the Processor-based data accessing the the Ontology Database ODB and the Knowledge Database KDB and the Processor-based executing of the Element Detecting Program Module ED-PGM to carry out the third MDP-step. Consequently, first due to an access to the Knowledge Database KDB by addressing firstly a further Normalized, Decision-Labeled Issue Requests REQ_DEC*, LAB*[NOR($I_{urs}$)] to the Knowledge Database KDB the normalized, further decision-labeled issue DEC*, LAB*[NOR($I_{urs}$)] is read or extracted from the Knowledge Database KDB. Then, secondly due to an access to the Ontology Database ODB by addressing the General Data Request REQ_GDA to the Ontology Database ODB, the general data GDA is read or extracted from the Ontology Database ODB.

In addition by executing the Element Detecting Program Module ED-PGM the analysis is done on the basis of the normalized, further decision-labeled issue DEC*, LAB*[NOR($I_{urs}$)] and the general data GDA. The result of the analysis could be either the determination of the further Relevant Element $E_{rv}$* and the corresponding further marker MAR* of the normalized, further decision-labeled issue DEC*, LAB*[NOR($I_{urs}$)] or the determination of a non-existing Relevant Element depicted as "ignore". This normalized, further decision-labeled, further element-marked issues $E_{rv}$*, MAR*{LAB*[NOR($I_{urs}$)]} is then stored in the Knowledge Database System KDB in the course of the Processor's PRC access to the Knowledge Database KDB.

In the subsequent fourth MDP-step, in which the Processor PRC of the Measure Recommendation System MRS respectively the Computer-Program-Product CPP accesses the Knowledge Database System KDBS and executes the Matrix Processing Program Module MP-PGM, the normalized, further decision-labeled, further element-marked issues $E_{rv}$*, MAR*{LAB*[NOR($I_{urs}$)]}, stored in the Knowledge Database System KDB, is processed such that according to FIG. 6 an Issue Evaluation Vector IEV is created, wherein
the vector elements of the Issue Evaluation Vector IEV with a number n of vector elements, which correspond to the number of Relevant Elements $E_{rv}$ determined for the normalized, decision-labeled, element-marked issues $E_{rv}$, MAR{LAB[NOR($I_{urs}$)]} in the Issue Evaluation Matrix IEM, $M_{m,n}$, are formed by the further Relevant Element $E_{rv}$* determined for the normalized, further decision-labeled, further element-marked issue $E_{rv}$*, MAR*{LAB*[NOR($I_{urs}$)]}, which correspond each to one Relevant Element of the Relevant Elements $E_{rv}$, determined for the normalized, decision-labeled, element-marked issues $E_{rv}$*, MAR*{LAB*[NOR($I_{urs}$)]} in the Issue Evaluation Matrix IEM, $M_{m,n}$, and filled with "zero-value"-elements accordingly, if there is no "Relevant Element $E_{rv}$, $E_{rv}$*-Correspondence".

Advantageously, if with regard to the creation of the Issue Evaluation Vector IEV more than one identical further Relevant Element $E_{rv}$* is determined for the normalized, decision-labeled, element-marked issue $E_{rv}$*, MAR*{LAB*[NOR($I_{urs}$)]} the frequency of the identical further Relevant Element $E_{rv}$* is considered in the creation of the Issue Evaluation Vector IEV by increasing the value of the corresponding vector element accordingly.

By this fourth MDP-step according to the depiction in the FIG. 6 the Issue Evaluation Vector IEV is created. Once a new unresolved issue $I_{urs}$ is imported into Issue Tracking Database System ITDBS, it is checked if it represents at least one decision DEC*. If so, it is identified at least one Relevant Element $E_{rv}$* within this decision. The frequency of occurrence of the Relevant Element represents its weightage with the decision.

The Issue Evaluation Vector IEV=($iev_1$, $iev_2$, $iev_3$, . . . , $iev_n$) with a vector element $iev_i$ comprising a value ≥0 and n the number of Relevant Elements in the entire dataset is created by this fourth MDP-step for the new unresolved issue Lis, i.e. the decision DEC*. This is an integer array of size n initialized with zero values. The value of the vector element $iev_i$ is then replaced with the frequency count of the corresponding Relevant Element $E_{rv}$*.

In the final fifth MDP-step, in which the Processor PRC of the Measure Recommendation System MRS respectively the Computer-Program-Product CPP accesses the Knowledge Database System KDBS and executes the Measure Determining Program Module MD-PGM, a measure MEA is determined on the basis of a Measure Determination Vector MDV generated by vector products of each the Issue Evaluation Vector IEV and a dedicated Resolver Profile Vector $RPV_i$ of the Resolver Profile Vectors RPV depicted in the FIG. 8 and made up from those matrix elements ME, $M[r_i, e_j]$ of the Issue Evaluation Matrix IEM, $M_{m,n}$ with the same "Resolver"-attribute R of a set D of Resolver Profile Vectors RPV in the Issue Evaluation Matrix IEM, $M_{m,n}$.

By this final MDP-step according to the depiction in the FIG. 9 due to applying a function MATCHING and a function PRIORITIZATION the determination of the measure MEA is carried out. Consequently, the Issue Evaluation Vector IEV generated in the previous fourth MDP-step is matched against the Issue Evaluation Matrix IEM, $M_{m,n}$ stored in the Knowledge Database KDB to generate a recommendation list of experts respectively a list of tools in other words an "expertList/toolList" EL/TL according to the FIG. 9, who/which are suited to address the corresponding decision.

It should be denoted once more that with such an "expertList/toolList" it is much easier and faster to have a progress within the technical domain related project, which has at the end a competitive advantage on the global market of a technical product being developed, designed and/or deployed in the technical domain. Besides that or in addition to this, the "expertList/toolList" is sustainably useful and of economical, technical importance or beneficial with respect to the maintenance of those technical domain related systems or products.

The function MATCHING takes as input the Issue Evaluation Vector IEV, the Issue Evaluation Matrix $M_{m,n}$ and a set D of experts (individuals), e.g. architects and developers. For each expertise profile respectively Resolver Profile Vectors RPV (expert vector) given by the rows in the Issue Evaluation Matrix $M_{m,n}$, the Measure Determining Vector MDV of size n is created. Each element in Measure Determining Vector MDV is the product of the frequency of a Relevant Element in a new decision (Issue Evaluation Vector IEV[ . . . $_i$]) and the experience level $M[r_i,e_j]$ of the respective individual corresponding to that Relevant Element. For instance, if a new decision emphasizes a Relevant Element with a higher frequency count and a specific individual has more experience with this specific Relevant Element, then a score for that individual proportionally increase with respect to both these variables. Once the expert vector is generated for an individual, the function PRIORITIZATION takes place by calculating the score, which is calculated as the magnitude (vector length) of that expert vector. The magnitude of the expert vector is calculated as the square root of the dot product of the vector by itself. Hence, the score generated for an individual is equally distributed across all expertise required to address the new decision. If this score is greater than zero, the corresponding individual along with the score is added to the "expertList/toolList" EL/TL. as a last step, after iterating over all expertise profile, the "expertList/toolList" EL/TL is ordered by score.

The "expertList/toolList" EL/TL is created by applying the function MATCHING and the function PRIORITIZATION on the basis of the Measure Determination Vector MDV being generated (cf. FIG. 9) according to some pseudo code described by the following algorithm:

```
//Matching
1:    function MATCH(IEV, M_{m,n}, D)
2:        "expertList/toolList" ← { }
3:        for i in 0..m do
4:            MDV ← newArray(n);
5:            for j in 0..n do
6:                MDV[..j] ← IEV[..j] × M [..i,..j], wherein M[..i,..j] =(RPV_i)
7:            end for
//Prioritizing by computing a score as a vector magnitude
8:            sum ← 0
9:            for j in 0..n do
10:               sum ← sum + MDV[..j] × MDV[..j]
11:           end for
12:           score ← SQRT(sum)
13:           if score >0 then
14:               "expertList/toolList":add("person"/"tool",D[..i])
15:           "expertList/toolList":add("score", score)
16:           end if
17:       end for
18:       "expertList/toolList" ← ORDERBY("expertList/toolList","score")
19:   end function;
``` wherein $M_{m,n}$ is the Issue Evaluation Matrix <IEM> calculating R × $E_{rv}$ with R for Resolver, e.g. expert or tool, as rows and $E_{rv}$ for the Relevant Element as columns and
- R = {$r_1, r_2, r_3, ....., r_m$} : the set of Resolvers;
- $E_{rv}$ = {$e_1,e_2, e_3, ....., e_n$} : the set of Relevant Elements;
- $M_{m,n}$ = R × $E_{rv}$: the Issue Evaluation Matrix <IEM> which captures the expertise of the experts or the significance of the tools;
- Matrix element $M[r_i,e_j]$ in $M_{m,n}$ represents an Experience/Significance Atom <ESA>;
- Experience/Significance Atom <ESA>: a cell $M[r_i,e_j]$ in $M_{m,n}$ representing an elementary atom of experience/significance;
- Resolver Profile Vector: each row M[...i,...j] within the Issue Evaluation Matrix $M_{m,n}$;
- Issue Evaluation Vector <IEV>;
- Measure Determination Vector <MDV>;
- Set D of rows in the Issue Evaluation Matrix <IEM>.

The Issue Evaluation Matrix IEM, $M_{m,n}$, the Measure Determination Vector MDV and the "expertList/toolList" EL/TL are stored in the Knowledge Database KDB of the Knowledge Database System KDBS.

The determined measure MEA is either concrete, if the Measure Determination Vector MDV comprises at least one vector element which is not a "zero-value"-vector element, or non-existent, if the Measure Determination Vector MDV is a "zero-value"-vector.

As shown in the FIG. 9 the proposed Measure Recommendation System MRS depicted in FIGS. 1A and B allow end users to type a textual description of a decision in order to obtain a recommended list of experts who could be involved in the decision making process for that unresolved issue $I_{urs}$.

As soon as the unresolved issue $I_{urs}$ is resolved, dependently or independently from the determined measure MEA, the unresolved issue $I_{urs}$ becomes a new resolved issue $I_{rs}$*, which is stored in the Knowledge Database KDB of the Knowledge Database System KDBS.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

REFERENCES

[1] C. Zannier, M. Chiasson, and F. Maurer, "A model of design decision making based on empirical results of interviews with software designers," Information and Software Technology, vol. 49, no. 6, pp. 637-653, 2007.

[2] S. T. Hassard, A. Blandford, and A. L. Cox, "Analogies in design decision-making," in Proceedings of the 23rd British HCI group annual conference on people and computers: celebrating people and technology. British Computer Society, 2009, pp. 140-148.

[3] C. Zannier and F. Maurer, "Social factors relevant to capturing design decisions," in Proceedings of the Second Workshop on Sharing and Reusing architectural Knowledge Architecture, Rationale, and Design Intent. IEEE Computer Society, 2007, p. 1.

[4] H. van Vliet and A. Tang, "Decision making in software architecture," Journal of Systems and Software, vol. 117, pp. 638-644, 2016.

[5] A. Tang, M. Razavian, B. Paech, and T.-M. Hesse, "Human aspects in software architecture decision making: A literature review," in Software Architecture (ICSA), 2017 IEEE International Conference on. IEEE, 2017, pp. 107-116.

[6] M. Galster, D. A. Tamburri, and R. Kazman, "Towards understanding the social and organizational dimensions of software architecting," ACM SIGSOFT Software Engineering Notes, vol. 42, no. 3, pp. 24-25, 2017.

[7] C. Miesbauer and R. Weinreich, "Classification of design decisions—an expert survey in practice," in European Conference on Software Architecture. Springer, 2013, pp. 130-145.

The invention claimed is:

1. A method for determining measures for at least one of the development, design and deployment of complex embedded or cyber-physical systems, wherein complex software architectures are used therein, of different technical domains, comprising:
 a) using an issue Evaluating Phase, in which
  a1) resolved issues of an Issue Tracking Database System either already structured or unstructured, and based on different kinds of data sources, which contain each at least one identification data field concerning at least a "Resolver"-attribute of a respective issue and one content related data field concerning at least "Summary"- and/or "Description"-attributes of the respective issue, are automatically edited and evaluated such that
  the resolved issues are normalized and accordingly stored as normalized resolved issues in a Knowledge Database System,
  a2) decisions being inherent in the normalized resolved issues are identified and classified into categories by a machine learning algorithm,
  a3) the normalized resolved issues being identified and classified regarding the decisions are provided with labels,
  a4) the content related data field of the normalized, decision-labeled issues are analyzed such that
   a41) on the basis of general data of an Ontology Database System, Relevant Elements are determined,
   a42) the normalized, decision-labeled issues, the Relevant Elements have been determined for, are provided with markers,
  a5) the normalized, decision-labeled, element-marked issues stored in the Knowledge Database System are processed such that
   a51) an Issue Evaluation Matrix is created, wherein
    a511) matrix elements of the Issue Evaluation Matrix are formed on the one hand by the "Resolver"-attributes in the identification data fields of the normalized, decision-labeled, element-marked issues and on the other hand by the Relevant Elements determined for the normalized, decision-labeled, element-marked issues and
    a512) each matrix element is weighted by determining the relevance, of the normalized, decision-labeled, element-marked issues having for the said matrix element the same matrix element constellation,
 b) using a Measure Determining Phase, in which
  b1) at least one unresolved issue of the Issue Tracking Database System either already structured or unstructured, regarding type and format, and based on one of the different kinds of data sources, which contains each at least one content related data field concerning at least "Summary"- and/or "Description"-attributes of said issue, is automatically edited and evaluated such that the unresolved issue is normalized and accordingly stored as a normalized unresolved issue in the Knowledge Database System,
  b2) at least one further decision being inherent to the normalized unresolved issue is identified and classified into the categories by a machine learning algorithm,
  b3) the normalized unresolved issue being identified and classified regarding the further decision is provided with a further label,
  b4) the content related data field of the normalized, further decision-labeled issue is analyzed such that
   b41) on the basis of the general data of the Ontology Database System at least one further Relevant Element is determined,
   b42) the normalized, further decision-labeled issue, the further relevant element has been determined for, is provided with a further marker,
  b5) the normalized, further decision-labeled, further element-marked issue stored in the Knowledge Database System is processed such that
   an Issue Evaluation Vector is created, wherein the vector elements of the Issue Evaluation Vector with a number of vector elements, which correspond to the number of Relevant Elements determined for the normalized, decision-labeled, element-marked issues in the Issue Evaluation Matrix, are formed by the further Relevant Element determined for the normalized, further decision-labeled, further element-marked issue, which correspond each to one Relevant Element of the Relevant Elements determined for the normalized, decision-labeled, element-marked issues in the Issue Evaluation Matrix, and filled with "zero-value"-elements accordingly, if there is no "Relevant Element-Correspondence",
  b6) a measure for the development, design and/or deployment of the complex embedded or the cyber-physical systems, of the different technical domains is determined on the basis of a Measure Determination Vector generated by vector products of each the Issue Evaluation Vector and a dedicated Resolver Profile Vector, made up each from those matrix elements of the Issue Evaluation Matrix with the same "Resolver"-attribute of a set of Resolver Profile Vectors in the Issue Evaluation Matrix.

2. The method according to claim 1, wherein the "Resolver" attributes are experts, given by their names, regarding at least one of the development, design and deployment of the complex embedded or the cyber-physical systems of the different technical domains.

3. The method according to claim 1, wherein the "Resolver" attributes are tools regarding at least one of the development, design and deployment of the complex embedded or the cyber-physical systems, wherein the complex software architectures used therein, of the different technical domains.

4. The method according to claim 2, wherein a set of rows in the Issue Evaluation Matrix are denoted with the experts or tools and accordingly the Resolver Profile Vector of the set of the Resolver Profile Vectors becomes a Expert/Tool Profile Vector.

5. The method according to claim 2, wherein an "expertList/toolList" is created by matching and prioritizing on the basis of the Measure Determination Vector being generated according to pseudo code described by the following algorithm:

```
//matching
 1:    function MATCH(IEV, M_{m,n}, D)
 2:    "expertList/toolList" ← { }
 3:    for i in 0..m do
 4:        MDV ← newArray(n);
 5:        for j in 0..n do
 6:            MDV[...,j] ← IEV[...,j] x M[...,i,...,j], wherein M[...,i,...,j] =(Resolver Profile Vector_i)
 7:        end for
//prioritizing by computing a score as a vector magnitude
 8:        sum ← 0
 9:        for j in 0..n do
10:            sum ← sum + MDV[...,j] x MDV[...,j]
11:        end for
12:        score ← SQRT(sum)
13:        if score >0 then
14:            "expertList/toolList":add("person"/"tool", D[...,i])
15:            "expertList/toolList" :add("score", score)
16:        end if
17:    end for
18:    "expertList/toolList" ← ORDERBY("expertList/toolList", "score")
19:    end function;
``` wherein $M_{m,n}$ is the Issue Evaluation Matrix <IEM> calculating R x $E_{r,v}$ with R for Resolver, e.g. expert or tool, as rows and $E_{r,v}$ for the Relevant Element as columns and
- R = {$r_1$, $r_2$, $r_3$, ....., $r_m$} : the set of Resolvers;
- $E_{r,v}$ = {$e_1$, $e_2$, $e_3$, ....., $e_n$} : the set of Relevant Elements;
- $M_{m,n}$ = R x $E_{r,v}$: the Issue Evaluation Matrix <IEM> which captures the expertise of the experts or the significance of the tools;
- Matrix element $M[r_i,e_j]$ in $M_{m,n}$ represents an Experience/Significance Atom <ESA>;
- Experience/Significance Atom <ESA>: a cell $M[r_i,e_j]$ in $M_{m,n}$ representing an elementary atom of experience/significance;
- Resolver Profile Vector: each row M[...,i, ...,j] within the Issue Evaluation Matrix $M_{m,n}$;
- Issue Evaluation Vector <IEV>;
- Measure Determination Vector <MDV>;
- et D of rows in the Issue Evaluation Matrix <IEM>.

6. The method according to claim 5, wherein the Issue Evaluation Matrix, the Measure Determination Vector and the "expertList/toolList"are stored in the Knowledge Database System.

7. The method according to claim 1, wherein, if with regard to the creation of the Issue Evaluation Vector more than one identical further Relevant Element is determined for the normalized, decision-labeled, element-marked issue the frequency of the identical further Relevant Element is considered in the creation of the Issue Evaluation Vector by increasing the value of the corresponding vector element accordingly.

8. The method according to claim 1, wherein the determined measure is either concrete, if the Measure Determination Vector comprises at least one vector element which is not a "zero-value"-vector element, or non-existent, if the Measure Determination Vector is a "zero-value"-vector.

9. The method according to claim 1, wherein when the unresolved issue is resolved, dependently or independently from the determined measure, the unresolved issue becomes a new resolved issue, which is stored in the Issue Tracking Database System.

10. A computer-program-product, comprising a computer readable hardware storage device having computer readable program code stored therein, said program code executable by a processor of a computer system to implement a method to determine measures for development, design and/or deployment of complex embedded or cyber physical systems, wherein complex software architectures used therein, of different technical domains, wherein
a) in an Issue Evaluating Phase the processor is executing program-instructions of
a1) an Importing Program Module by which resolved issues of an Issue Tracking Database System either already structured or unstructured, and based on different kinds of data sources, which contain each at least one identification data field concerning at least a "Resolver"-attribute of a respective issue and one content related data field concerning at least "Summary"- and/or "Description"-attributes of the respective issue are edited and evaluated such that the resolved issues are normalized and accordingly stored as normalized resolved issues in a Knowledge Database System by the processor accessing the Issue Tracking Database System and the Knowledge Database System,
a2) a Decision Detection Program Module by which decisions being inherent in the normalized resolved issues are identified and classified into categories by a machine learning algorithm,
a3) the Decision Detection Program Module by which the normalized resolved issues being identified and classified regarding the decisions are provided with labels by the processor accessing the Knowledge Database System,
a4) an Element Detecting Program Module by which the content related data field of the normalized, decision-labeled issues are analyzed such that
a41) on the basis of general data of an Ontology Database System, Relevant Elements are determined by the processor accessing the Ontology Database System,
a42) the normalized, decision-labeled issues, the Relevant Elements have been determined for, are provided with markers by the processor accessing the Knowledge Database System,
a5) a Matrix Processing Program Module by which the normalized, decision-labeled, element-marked issues stored in the Knowledge Database System are processed by the processor accessing the Knowledge Database System and such that
a51) an Issue Evaluation Matrix is created, wherein
a511) matrix elements of the Issue Evaluation Matrix are formed on the one hand by the "Resolver"-attributes in the identification data fields of the normalized, decision-labeled, element-marked issues and on the other hand by the Relevant Elements determined for the normalized, decision-labeled, element-marked issues and
a512) each matrix element is weighted by determining the relevance, of the normalized, decision-labeled, element-marked issues having for the said matrix element the same matrix element constellation,
b) in a Measure Determining Phase the processor is executing the program-instructions of
b1) the importing Program Module by which at least one unresolved issue of the Issue Tracking Database System either already structured or unstructured, and based on one of the different kinds of data sources, which contains each at least one content related data field concerning at least "Summary"-and/or "Description"-attributes of said issue, is automatically edited and evaluated such that the unresolved issue is normalized and accordingly stored as a normalized unresolved issue in the Knowledge Database System by the processor accessing the Issue Tracking Database System and the Knowledge Database System, b2) a Decision Detection Program Module by which at least one further decision being inherent in the normalized unresolved issue is identified and classified into the categories by a machine learning algorithm, b3) the Decision Detection Program Module by which the normalized unresolved issue being identified and classified regarding the further decision is provided with a further label by the processor accessing the Knowledge Database System, b4) an Element Detecting Program Module by which the content related data field of the normalized, further decision-labeled issue is analyzed such that b41) on the basis of the general data of the Ontology Database System at least one further Relevant Element is determined by the processor accessing the Ontology Database System, b42) the normalized, further decision-labeled issue, the further relevant element has been determined for, is provided with a further marker by the processor accessing the Knowledge Database System, b5) a Vector Processing Program Module by which the normalized, further decision-labeled, further element-marked issue stored in the Knowledge Database System is processed by the processor accessing the Knowledge Database System and such that an Issue Evaluation Vector is created, wherein the vector elements of the Issue Evaluation Vector with a number (n) of vector elements, which correspond to the number of Relevant Elements determined for the normalized, decision-labeled, element-marked issues in the Issue Evaluation Matrix, are formed by the further Relevant Element determined for the normalized, further decision-labeled, further element-marked issue, which correspond each to one Relevant Element of the Relevant Elements determined for the normalized, decision-labeled, element-marked issues in the Issue Evaluation Matrix, and filled with "zero-value"-elements accordingly, if there is no "Relevant Element-Correspondence", b6) a Measure Determining Program Module by which a measure for the development, design and/or deployment of the complex embedded or the cyber-physical systems, of the different technical domains is determined on the basis of a Measure Determination Vector generated by vector products of each the Issue Evaluation Vector and a dedicated Resolver Profile Vector, made up from those matrix elements of the Issue Evaluation Matrix with the same "Resolver"-attribute of a set of Resolver Profile Vectors in the Issue Evaluation Matrix.

11. The computer-program-product according to claim 10, wherein the "Resolver" attributes are experts regarding the development, design and/or deployment of the complex embedded or the cyber-physical systems of the different technical domains.

12. The computer-program-product according to claim 10, wherein the "Resolver" attributes are tools regarding the development, design and/or deployment of the complex embedded or the cyber-physical systems of the different technical domains.

13. The computer-program-product according to claim 11, wherein a set of rows in the Issue Evaluation Matrix are denoted with the experts or tools and accordingly the Resolver Profile Vector o the set of the Resolver Profile Vectors becomes a Expert/Tool Profile Vector.

14. The computer-program-product according to claim 11, wherein the processor is executing the program-instructions of the Matrix Processing Program Module, the Vector Processing Program Module and the Measure Determining Program Module thereby accessing the Knowledge Database System such that an "expertList/toolList" is created by matching and prioritizing on the basis of the Measure Determination Vector being generated according to pseudo code described by the following algorithm:

```
//Matching
1:   function MATCH(IEV, M_{m,n}, D)
2:   "expertList/toolList" ← { }
3:   for i in 0..m do
4:     MDV ← newArray(n);
5:     for j in 0..n do
6:       MDV[_,j] ← IEV[_,j] × M[_,i,_,j], wherein M [_,i,_,j] =(Resolver Profile Vector_i)
7:     end for
//Prioritizing by computing a score as a vector magnitude
8:     sum ← 0
9:     for j in 0..n do
10:      sum ← sum + MDV[_,j] × MDV[_,j]
11:    end for
12:    score ← SQRT(sum)
13:    if score >0 then
14:      "expertList/toolList":add("person"/"tool", D[_,i])
15:      "expertList/toolList":add("score", score)
16:    end if
17:   end for
18:   "expertList/toolList" ← ORDERBY("expertList/toolList","score")
19:   end function;
```
wherein $M_{m,n}$ is the Issue Evaluation Matrix <IEM> calculating R × $E_{rv}$ with R for Resolver, e.g. expert or tool, as rows and $E_{rv}$ for the Relevant Elementas columns and
- R = {$r_1, r_2, r_3, ....., r_m$} : the set of Resolvers;
- $E_{rv}$ = {$e_1, e_2, e_3, ....., e_n$} : the set of Relevant Elements;
- $M_{m,n}$ = R × $E_{rv}$:the Issue Evaluation Matrix <IEM> which captures the expertise of the experts or the significance of the tools;
- Matrix element M[$r_i, e_j$] in $M_{m,n}$ represents an Experience/Significance Atom <ESA>;
- Experience/Significance Atom <ESA>: a cell M[$r_i, e_j$] in $M_{m,n}$ representing an elementary atom of experience/significance;
- Resolver Profile Vector: each row M[_,i,_,j] within the Issue Evaluation Matrix $M_{m,n}$;
- Issue Evaluation Vector <IEV>;
- Measure Determination Vector <MDV>;
- Set D of rows in the Issue Evaluation Matrix <IEM>.

15. The computer-program-product according to claim 14, wherein the Issue Evaluation Matrix, the Measure Determination Vector and the "expertList/toolList" are stored in the Knowledge Database System.

16. The computer-program-product according to claim 10, wherein, if with regard to the creation of the Issue Evaluation Vector more than one identical further Relevant Element is determined for the normalized, decision-labeled, element-marked issue the frequency of the identical further Relevant Element is considered in the creation of the Issue Evaluation Vector by increasing the value of the corresponding vector element accordingly.

17. The computer-program-product according to claim 10, wherein the determined measure is either concrete, if the Measure Determination Vector comprises at least one vector element which is not a "zero-value"-vector element, or non-existent, if the Measure Determination Vector is a "zero-value"-vector.

18. The computer-program-product according to claim 10, wherein when the unresolved issue is resolved, dependently or independently from the determined measure, the unresolved issue becomes a new resolved issue, which is stored in the issue Tracking Database System.

* * * * *